(12) United States Patent
Suzuki et al.

(10) Patent No.: US 11,316,434 B2
(45) Date of Patent: Apr. 26, 2022

(54) ELECTRIC POWER CONVERSION APPARATUS

(71) Applicant: DENSO CORPORATION, Kariya (JP)

(72) Inventors: Yoshiki Suzuki, Kariya (JP); Shuji Kurauchi, Kariya (JP); Yuichi Handa, Kariya (JP); Seiji Iyasu, Nisshin (JP); Yuji Hayashi, Nisshin (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/594,123

(22) Filed: Oct. 7, 2019

(65) Prior Publication Data
US 2020/0112260 A1 Apr. 9, 2020

(30) Foreign Application Priority Data

Oct. 5, 2018 (JP) .............................. JP2018-189867

(51) Int. Cl.
*H02J 7/00* (2006.01)
*H02M 3/335* (2006.01)

(52) U.S. Cl.
CPC ........... *H02M 3/33584* (2013.01); *H02J 7/00* (2013.01); *H02J 2207/20* (2020.01)

(58) Field of Classification Search
CPC .......... H02J 7/00; H02J 2207/20; H02J 7/342; H02J 2310/48; H02M 3/04; H02M 3/155; H02M 3/33584; H02M 3/33561; H02M 3/33569; H02M 3/00; H02M 2001/008; H02M 2001/325; H02M 2001/007; Y02T 10/70
See application file for complete search history.

(56) References Cited

U.S. PATENT DOCUMENTS

2004/0095115 A1 5/2004 Kernahan et al.
2008/0212340 A1 9/2008 Tao et al.
(Continued)

FOREIGN PATENT DOCUMENTS

CN           106059305 A    10/2016
DE    10 2015 225 441 A1    8/2017
(Continued)

*Primary Examiner* — Lincoln D Donovan
*Assistant Examiner* — Alex W Lam
(74) *Attorney, Agent, or Firm* — Oliff PLC

(57) ABSTRACT

An electric power conversion apparatus includes a main DC-to-DC converter and an electric power conversion unit. The main DC-to-DC converter is configured to perform voltage conversion between a first-voltage section that operates at a first voltage and a second-voltage section that operates at a second voltage. The electric power conversion unit is connected with the first-voltage section and includes an electric power conversion section and an auxiliary DC-to-DC converter. The electric power conversion section is configured to perform electric power conversion between the first-voltage section and a third-voltage section that operates at a third voltage. The auxiliary DC-to-DC converter is connected in parallel with the main DC-to-DC converter. The auxiliary DC-to-DC converter shares a common configuration section with the electric power conversion section. The common configuration section is constituted of at least part of the electric power conversion section.

14 Claims, 23 Drawing Sheets

(56) References Cited

U.S. PATENT DOCUMENTS

| | | | |
|---|---|---|---|
| 2014/0103860 A1* | 4/2014 | Kominami | H02M 3/33584 |
| | | | 320/103 |
| 2015/0280579 A1 | 10/2015 | Ishigaki et al. | |
| 2016/0294190 A1* | 10/2016 | Li | H02M 3/158 |
| 2017/0279279 A1* | 9/2017 | Shimada | H02J 3/381 |
| 2018/0222333 A1 | 8/2018 | Khaligh et al. | |
| 2020/0112258 A1 | 4/2020 | Kurauchi et al. | |

FOREIGN PATENT DOCUMENTS

| | | |
|---|---|---|
| DE | 10 2017 201 667 A1 | 8/2018 |
| JP | 2002-171762 A | 6/2002 |
| JP | 2015-119598 A | 6/2015 |
| JP | 2017-212806 A | 11/2017 |

* cited by examiner

ELECTRIC POWER CONVERSION APPARATUS

CROSS-REFERENCE TO RELATED APPLICATION

This application is based on and claims priority from Japanese Patent Application No. 2018-189867 filed on Oct. 5, 2018, the contents of which are hereby incorporated by reference in their entirety into this application.

BACKGROUND

1 Technical Field

The present disclosure relates to electric power conversion apparatuses.

2 Description of Related Art

Conventionally, there has been known a power supply system that has a power supply auxiliary module connected in parallel with basic power supply modules, thereby securing redundancy.

SUMMARY

According to the present disclosure, an electric power conversion apparatus is provided which includes a main DC-to-DC converter and an electric power conversion unit. The main DC-to-DC converter is configured to perform voltage conversion between a first-voltage section that operates at a first voltage and a second-voltage section that operates at a second voltage. The electric power conversion unit is connected with the first-voltage section and includes an electric power conversion section and an auxiliary DC-to-DC converter. The electric power conversion section is configured to perform electric power conversion between the first-voltage section and a third-voltage section that operates at a third voltage. The auxiliary DC-to-DC converter is connected in parallel with the main DC-to-DC converter. The auxiliary DC-to-DC converter shares a common configuration section with the electric power conversion section. The common configuration section is constituted of at least part of the electric power conversion section.

DESCRIPTION OF EMBODIMENTS

Figure 1:
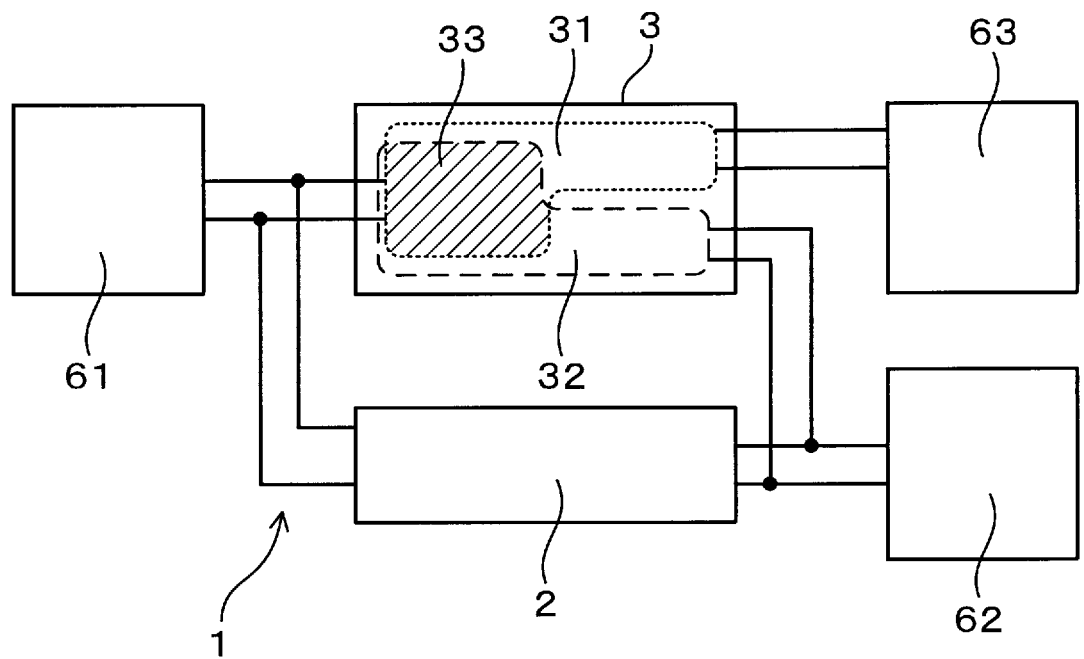
FIG. 1 is a schematic diagram of an electric power conversion apparatus according to a first embodiment.

In the conventional power supply system (see, for example, Japanese Patent Application Publication No. JP2002171762A), the power supply auxiliary module is added to the basic power supply modules only for the purpose of securing redundancy. Consequently, the parts count of the conventional power supply system is increased.

In contrast, in the above-described electric power conversion apparatus according to the present disclosure, the auxiliary DC-to-DC converter shares with the electric power conversion section the common configuration section which is constituted of at least part of the electric power conversion section. Consequently, it becomes possible to secure redundancy while suppressing increase in the parts count of the electric power conversion apparatus.

That is, according to the present disclosure, it becomes possible to provide the electric power conversion apparatus which has a structure capable of securing redundancy while suppressing increase in the parts count.

Exemplary embodiments will be described hereinafter with reference to FIGS. 1-27. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

An electric power conversion apparatus 1 according to the first embodiment will be described with reference to FIGS. 1 and 2.

As shown in FIG. 1, the electric power conversion apparatus 1 includes a main DC-to-DC converter 2 and an electric power conversion unit 3.

The main DC-to-DC converter 2 is configured to perform voltage conversion between a first-voltage section 61 that operates at a first voltage and a second-voltage section 62 that operates at a second voltage.

The electric power conversion unit 3 is connected with the first-voltage section 61. The electric power conversion unit 3 includes an electric power conversion section 31 and an auxiliary DC-to-DC converter 32.

The electric power conversion section 31 is configured to perform electric power conversion between the first-voltage section 61 and a third-voltage section 63 that operates at a third voltage.

The auxiliary DC-to-DC converter 32 is connected in parallel with the main DC-to-DC converter 2.

The auxiliary DC-to-DC converter 32 shares a common configuration section 33 with the electric power conversion section 31. The common configuration section 33 is constituted of at least part of the electric power conversion section 31, more particularly of the entire electric power conversion section 31 in the present embodiment.

The common configuration section 33 denotes a circuit configuration section which includes not merely wiring or the like, but, for example, an active element such as a semiconductor element and/or a passive element such as a transformer. It is preferable that the common configuration section 33 is, in particular, a circuit configuration section which includes a plurality of electronic components.

The first-voltage section 61, the second-voltage section 62 and the third-voltage section 63 may be implemented by various power supplies and electrical loads.

Figure 2:
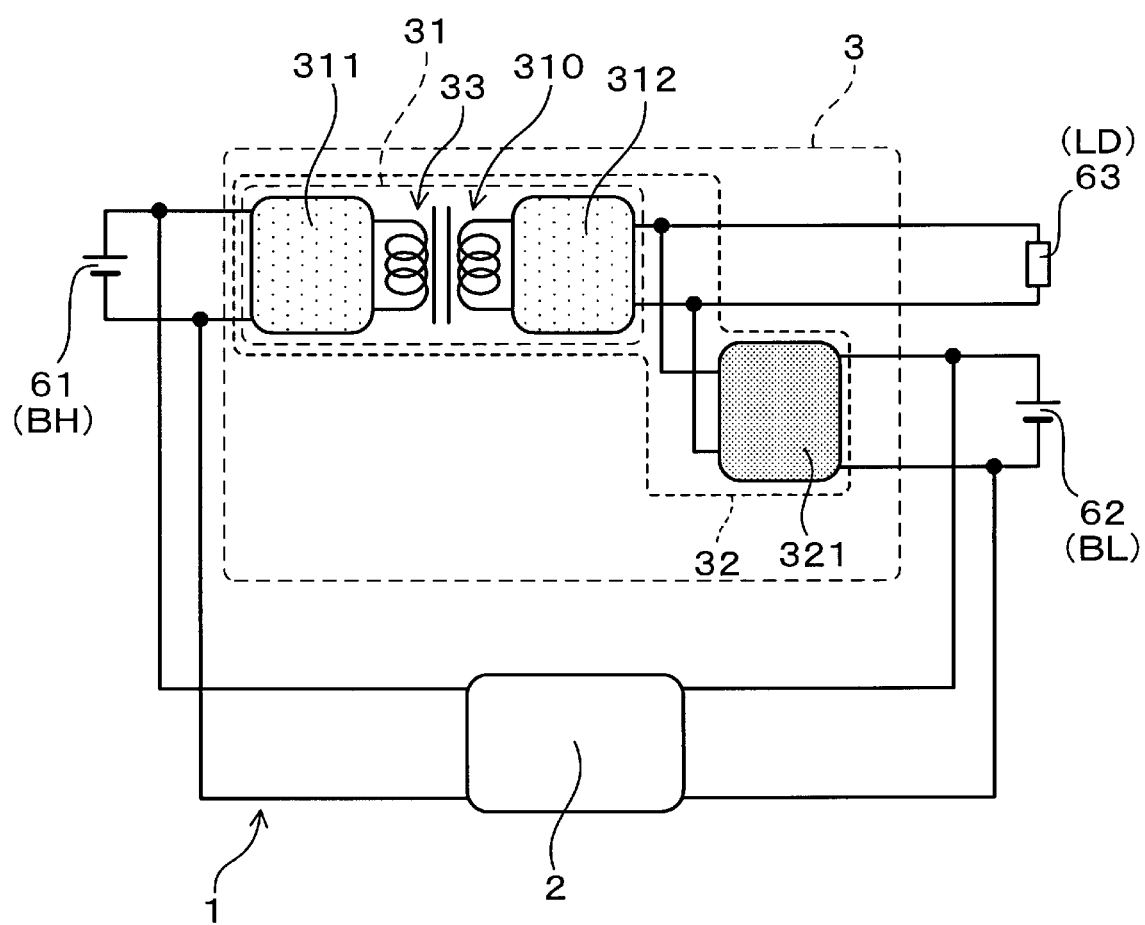
FIG. 2 is a circuit configuration diagram of the electric power conversion apparatus according to the first embodiment.

More particularly, in the present embodiment, as shown in FIG. 2, the first-voltage section 61 is constituted of a high-voltage battery BH whereas the second-voltage section 62 is constituted of a low-voltage battery BL which is lower in voltage than the high-voltage battery BH. Each of the high-voltage battery BH and the low-voltage battery BL is implemented by a rechargeable secondary battery. In addition, the low-voltage battery BL may alternatively be implemented by an electric power storage device that is configured with a capacitor. On the other hand, the third-voltage section 63 is constituted of electrical loads LD such as a heater.

Moreover, in the present embodiment, the electric power conversion apparatus 1 is configured to be used in a vehicle. Both the high-voltage battery BH and the low-voltage battery BL are installed in the vehicle. The high-voltage battery BH is configured to be used in, for example, an electric vehicle or a hybrid vehicle to store and supply electric power for driving the vehicle. On the other hand, the low-voltage battery BL is configured to store and supply electric power for operation of vehicular accessories (or auxiliary machines). The electrical loads LD may include, for example, a heater, an air conditioner, an actuator and a car audio device. In addition, the heater may be configured to heat a catalyst filter for purifying exhaust gas.

The electric power conversion section 31 includes a transformer 310 and a pair of switching circuit sections 311 and 312 that are connected with each other via the transformer 310. The electric power conversion section 31 constitutes, by the transformer 310 and the pair of switching circuit sections 311 and 312, a DC-to-DC converter.

Each of the switching circuit sections 311 and 312 includes, for example, a full-bridge circuit or a half-bridge circuit. The switching circuit section 311 is connected with the first-voltage section 61 whereas the switching circuit section 312 is connected with the third-voltage section 63.

In the present embodiment, the electric power conversion section 31 is configured to step down (or lower) the first voltage (i.e., the voltage at which the first-voltage section 61 operates, more particularly the output voltage of the high-voltage battery BH in the present embodiment) to the third voltage (i.e., the voltage at which the third-voltage section 63 operates) and supply the resultant third voltage to the third-voltage section 63 (i.e., the electrical loads LD in the present embodiment).

In the electric power conversion unit 3, a chopper circuit section 321 is connected to the third-voltage section 63-side output wirings of the electric power conversion section 31.

In addition, instead of the chopper circuit section 321, there may be connected a circuit section having a voltage conversion function, for example a non-isolated DC-to-DC converter such as a buck converter.

To the chopper circuit section 321, there is connected the second-voltage section 62 (i.e., the low-voltage battery BL in the present embodiment). In the present embodiment, the electric power conversion section 31 and the chopper circuit section 321 together constitute the auxiliary DC-to-DC converter 32.

That is, the auxiliary DC-to-DC converter 32 is constituted of the transformer 310, the two switching circuit sections 311 and 312 that are connected with each other via the transformer 310, and the chopper circuit section 321 connected to the third-voltage section 63-side output wirings of the switching circuit section 312.

In other words, in the present embodiment, the common configuration section 33, which is shared by the auxiliary DC-to-DC converter 32 and the electric power conversion section 31, is constituted of the entire electric power conversion section 31, i.e., constituted of the transformer 310 and the two switching circuit sections 311 and 312.

According to the present embodiment, it is possible to achieve the following advantageous effects.

In the above-described electric power conversion apparatus 1, the auxiliary DC-to-DC converter 32 shares with the electric power conversion section 31 the common configuration section 33 which is constituted of at least part of the electric power conversion section 31, more particularly of the entire electric power conversion section 31 in the present embodiment. Consequently, it becomes possible to secure redundancy while suppressing increase in the parts count of the electric power conversion apparatus 1.

Specifically, in the electric power conversion apparatus 1, to secure redundancy of the electric power conversion by the main DC-to-DC converter 2 between the first-voltage section 61 and the second-voltage section 62, the auxiliary DC-to-DC converter 32 is connected in parallel with the main DC-to-DC converter 2. Consequently, it becomes possible to perform, upon occurrence of any abnormality (or failure) in the main DC-to-DC converter 2, the electric power conversion between the first-voltage section 61 and the second-voltage section 62 by the auxiliary DC-to-DC converter 32 instead. That is, it becomes possible to secure redundancy of the electric power conversion between the first-voltage section 61 and the second-voltage section 62.

Moreover, in the electric power conversion apparatus 1, the auxiliary DC-to-DC converter 32 shares the common configuration section 33 with the electric power conversion section 31. That is, the auxiliary DC-to-DC converter 32 is not a dedicated DC-to-DC converter newly added to the electric power conversion apparatus 1 only for the purpose of securing redundancy. Instead, the auxiliary DC-to-DC converter 32 includes the common configuration section 33 which is constituted of at least part of the existing electric power conversion section 31 provided to perform other functions (e.g., to perform electric power conversion between the first-voltage section 61 and the third-voltage section 63). That is, in the auxiliary DC-to-DC converter 32, the common configuration section 33 is employed not only for securing redundancy, but also for performing other functions. Consequently, it becomes possible to suppress the parts count of the electric power conversion apparatus 1 from being increased for securing redundancy.

In particular, in the present embodiment, the entire electric power conversion section 31 constitutes the common configuration section 33. Consequently, it becomes possible to minimize increase in the parts count of the electric power conversion apparatus 1 due to the auxiliary DC-to-DC converter 32 provided for securing redundancy.

To sum up, according to the present embodiment, it becomes possible to provide the electric power conversion apparatus 1 which has a structure capable of securing redundancy while suppressing increase in the parts count.

Second Embodiment

Figure 3:
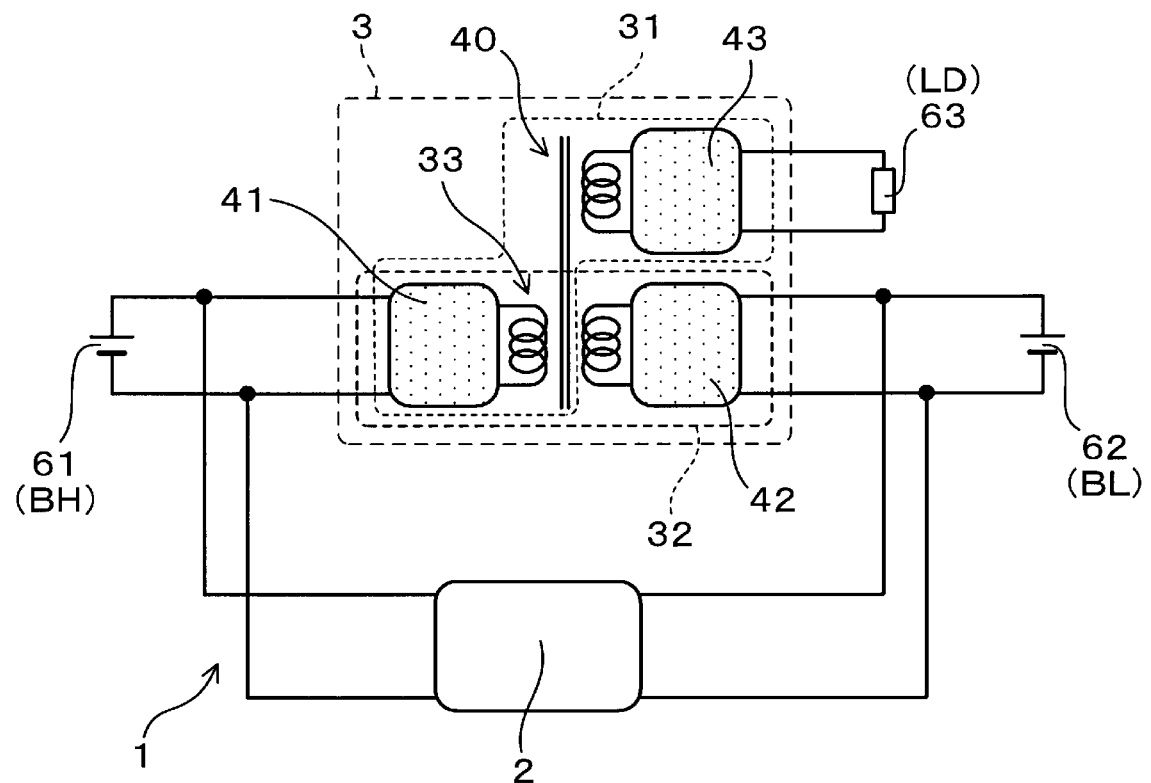
FIG. 3 is a circuit configuration diagram of an electric power conversion apparatus according to a second embodiment.
Figure 4:
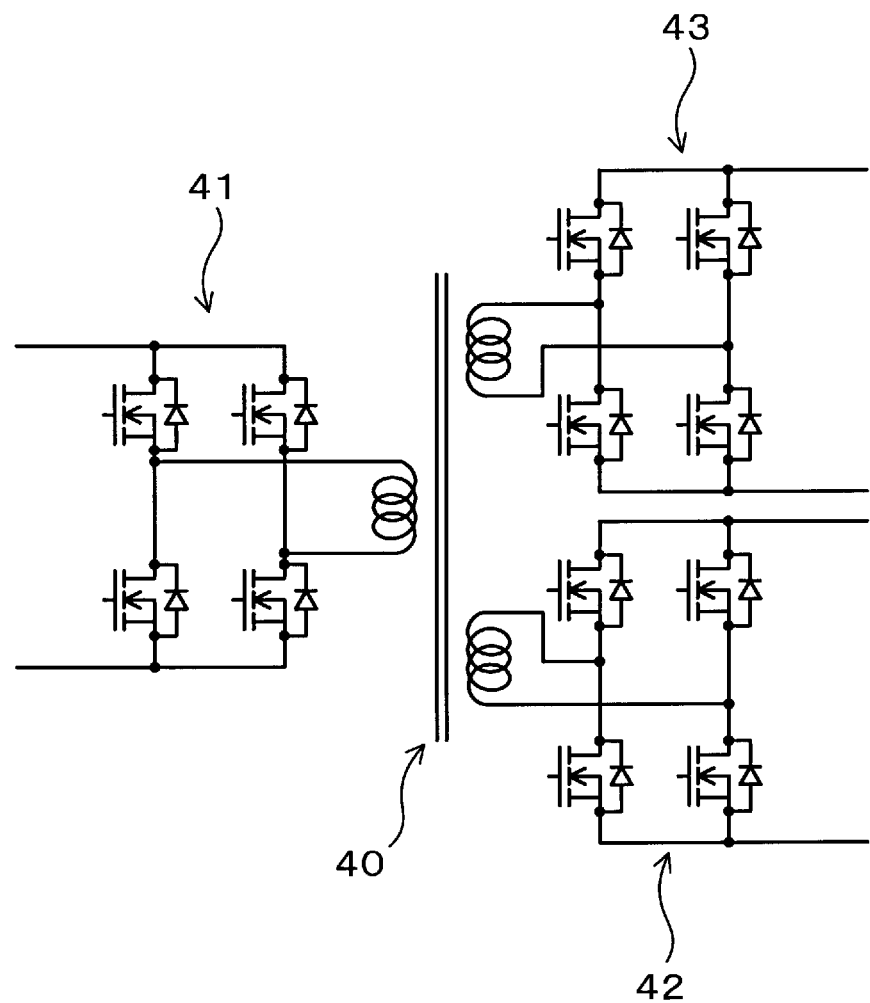
FIG. 4 is a circuit configuration diagram of part of the electric power conversion apparatus according to the second embodiment.

As shown in FIGS. 3 and 4, in an electric power conversion apparatus 1 according to the second embodiment, the electric power conversion unit 3 includes a multi-port transformer 40.

The multi-port transformer 40 is a transformer which includes three or more input/output ports. Moreover, the multi-port transformer 40 has three or more coils magnetically coupled with each other.

In the present embodiment, the electric power conversion unit 3 further includes a first switching circuit section 41, a second switching circuit section 42 and a third switching circuit section 43 in addition to the multi-port transformer 40.

The first switching circuit section 41 is connected with the first-voltage section 61. The second switching circuit section 42 is connected with the second-voltage section 62. The third switching circuit section 43 is connected with the third-voltage section 63. Moreover, the first switching circuit section 41, the second switching circuit section 42 and the third switching circuit section 43 are connected with each other via the multi-port transformer 40.

In addition, each of the first, second and third switching circuit sections 41, 42 and 43 may be configured with switching elements such as MOSFETs (Metal-Oxide-Semiconductor Field-Effect Transistors), IGBTs (Insulated Gate Bipolar Transistors) or diodes having a switching function.

As shown in FIG. 4, each of the first, second and third switching circuit sections 41, 42 and 43 has a bridge circuit configuration. That is, in the present embodiment, the electric power conversion unit 3 is configured with a MAB (Multiple Active Bridge) including the multi-port transformer 40 and the three switching circuit sections 41, 42 and 43.

For example, as shown in FIG. 4, each of the first, second and third switching circuit sections 41, 42 and 43 may have a full-bridge circuit configuration. As an alternative, each of the first, second and third switching circuit sections 41, 42 and 43 may have a half-bridge circuit configuration. As another alternative, one or two of the first, second and third switching circuit sections 41, 42 and 43 may have a full-bridge circuit configuration whereas the remainder of the first, second and third switching circuit sections 41, 42 and 4 may have a half-bridge circuit configuration.

In the present embodiment, the first switching circuit section 41 and the multi-port transistor 40 together constitute the common configuration section 33. That is, the auxiliary DC-to-DC converter 32 shares the multi-port transistor 40 and the switching elements of the first switching circuit section 41 with the electric power conversion section 31. Consequently, it becomes possible to considerably reduce the parts count of the electric power conversion apparatus 1.

As above, in the present embodiment, it becomes possible to constitute the auxiliary DC-to-DC converter 32, for securing redundancy of the main DC-to-DC converter 2, only by adding the second switching circuit section 42 to the existing electric power conversion section 31. Consequently, it becomes possible to suppress increase in the parts count of the electric power conversion apparatus 1 due to the auxiliary DC-to-DC converter 32 provided for securing redundancy.

Moreover, with employment of the multi-port transformer 40, it becomes possible to facilitate minimization of the size of the electric power conversion unit 3.

Furthermore, since each of the first, second and third switching circuit sections 41, 42 and 43 has a bridge circuit configuration, it is easy to broaden the input/output voltage range of the electric power conversion unit 3. Consequently, it becomes easy to cope with voltage variation, thereby securing high-efficiency electric power conversion. That is, by configuring the electric power conversion unit 3 with the MAB, it becomes possible to cope with wide variation in the electrical loads LD connected with the electric power conversion unit 3.

In addition, according to the present embodiment, it is also possible to achieve the same advantageous effects as described in the first embodiment.

Third Embodiment

Figure 5:
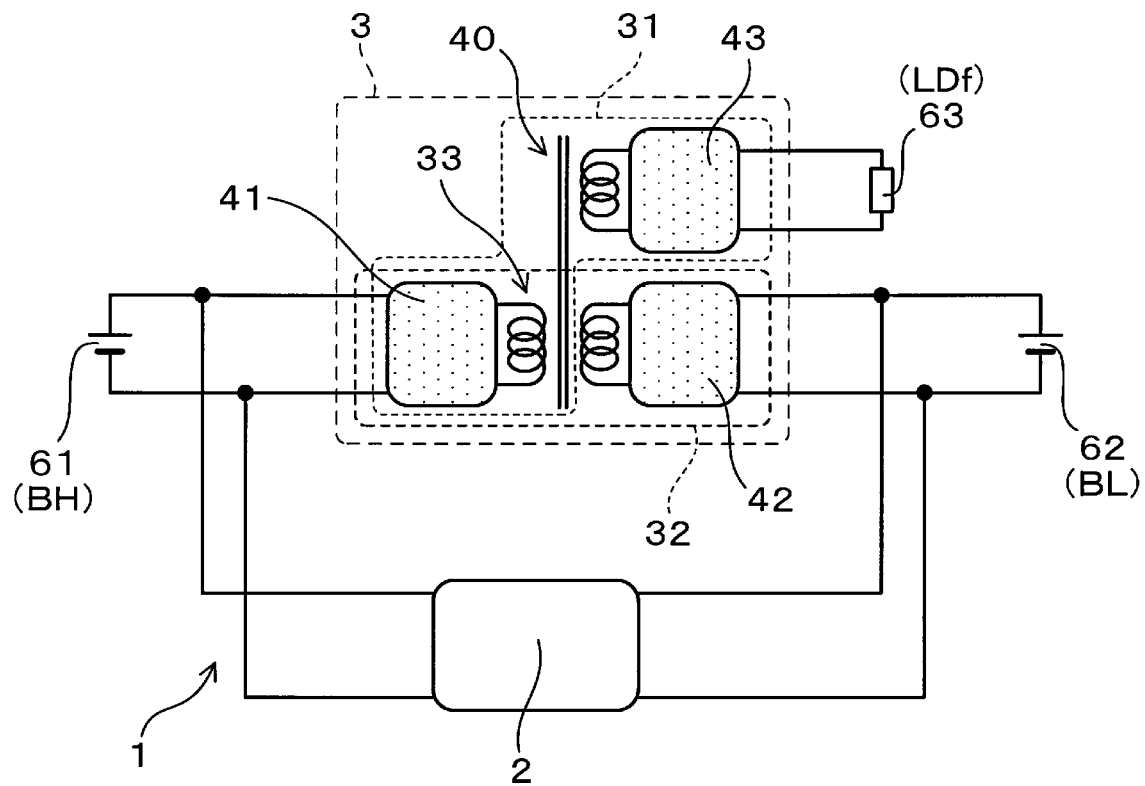
FIG. 5 is a circuit configuration diagram of an electric power conversion apparatus according to a third embodiment.
Figure 6:
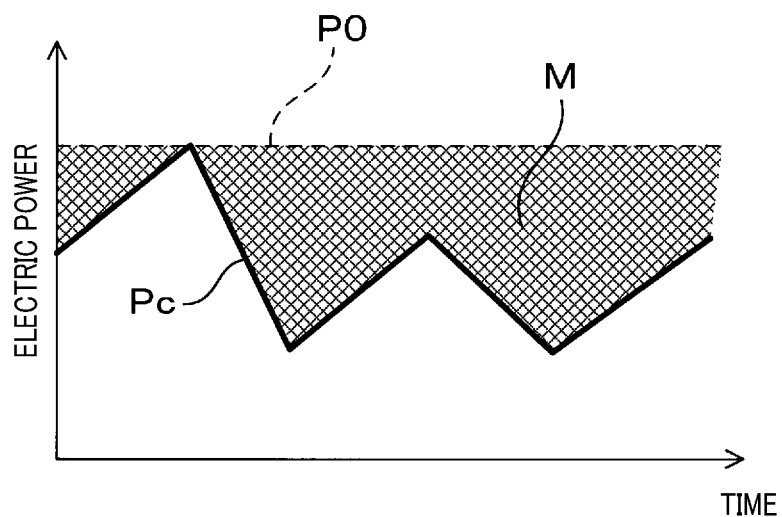
FIG. 6 is a time chart illustrating the change with time of electric power consumed by a third-voltage section in the electric power conversion apparatus according to the third embodiment.

As shown in FIGS. 5 and 6, in an electric power conversion apparatus 1 according to the third embodiment, the third-voltage section 63, which is connected with the electric power conversion section 31 of the electric power conversion unit 3, is constituted of a fluctuating electrical load LDf that fluctuates significantly with time.

The fluctuating electrical load LDf may be, for example, an air conditioner or a heater for warming up a catalyst, heating a seat or heating a battery. As shown in FIG. 6, the electric power Pc consumed by the fluctuating electrical load LDf fluctuates with time. Therefore, for sufficiently feeding the fluctuating electrical load LDf, it is necessary for the electric power conversion unit 3 to be capable of outputting electric power higher than or equal to a peak value of the electric power Pc consumed by the fluctuating electrical load LDf.

Accordingly, in the present embodiment, the electric power conversion unit 3 is configured to constantly output electric power P0 that is higher than or equal to the peak value of the electric power Pc consumed by the fluctuating electrical load LDf.

Moreover, during time periods for which the electric power Pc consumed by the fluctuating electrical load LDf is low, the electric power P0 outputted by the electric power conversion unit 3 exceeds the electric power Pc consumed by the fluctuating electrical load LDf. In this case, the excess electric power (P0-Pc) is supplied to the second-voltage section 62 via the auxiliary DC-to-DC converter 32. Consequently, it becomes possible to utilize the excess electric power (P0-Pc) regardless of the presence or absence of any abnormality (or failure) in the main DC-to-DC converter 2.

That is, in the present embodiment, the magnitude of the electric power converted by the electric power conversion section 31 changes with time. Moreover, the electric power conversion unit 3 is configured to be capable of increasing the electric power converted by the auxiliary DC-to-DC converter 32 when the electric power converted by the electric power conversion section 31 decreases and reducing the electric power converted by the auxiliary DC-to-DC converter 32 when the electric power converted by the electric power conversion section 31 increases.

In other words, during time periods for which the electric power converted by the electric power conversion section 31 is relatively low, it is possible to make the electric power converted by the auxiliary DC-to-DC converter 32 relatively high. In contrast, during time periods for which the electric power converted by the electric power conversion section 31 is relatively high, it is possible to make the electric power converted by the auxiliary DC-to-DC converter 32 relatively low.

In addition, the hatched area M in FIG. 6 represents the excess electric power (P0-Pc), i.e., the electric power supplied to the second-voltage section 62 via the auxiliary DC-to-DC converter 32. It should be noted that electric power loss is neglected in the above explanation with reference to FIG. 6.

Furthermore, in the present embodiment, upon occurrence of any abnormality in the main DC-to-DC converter 2, operation of the electric power conversion section 31 is stopped or limited, thereby supplying sufficient electric power to the second-voltage section 62 via the auxiliary DC-to-DC converter 32.

In addition, according to the present embodiment, it is also possible to achieve the same advantageous effects as described in the first and second embodiments.

Fourth Embodiment

Figure 7:
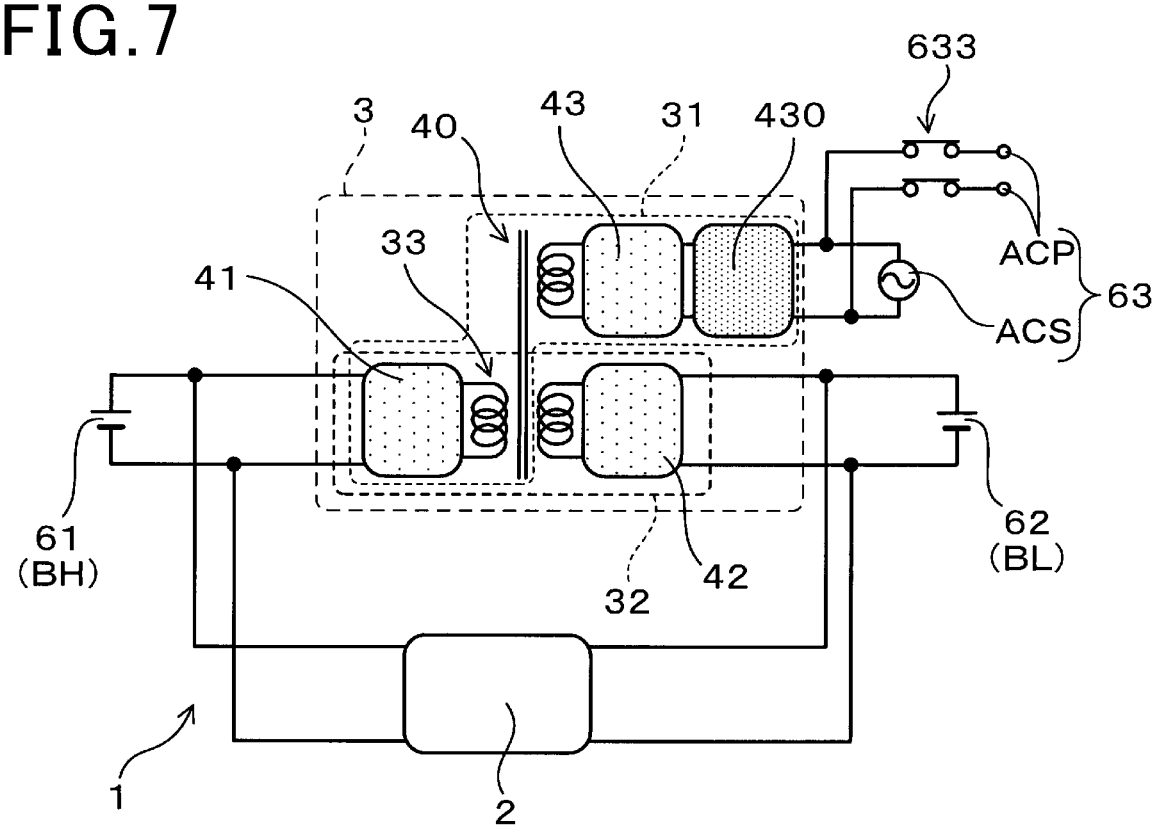
FIG. 7 is a circuit configuration diagram of an electric power conversion apparatus according to a fourth embodiment.
Figure 8:
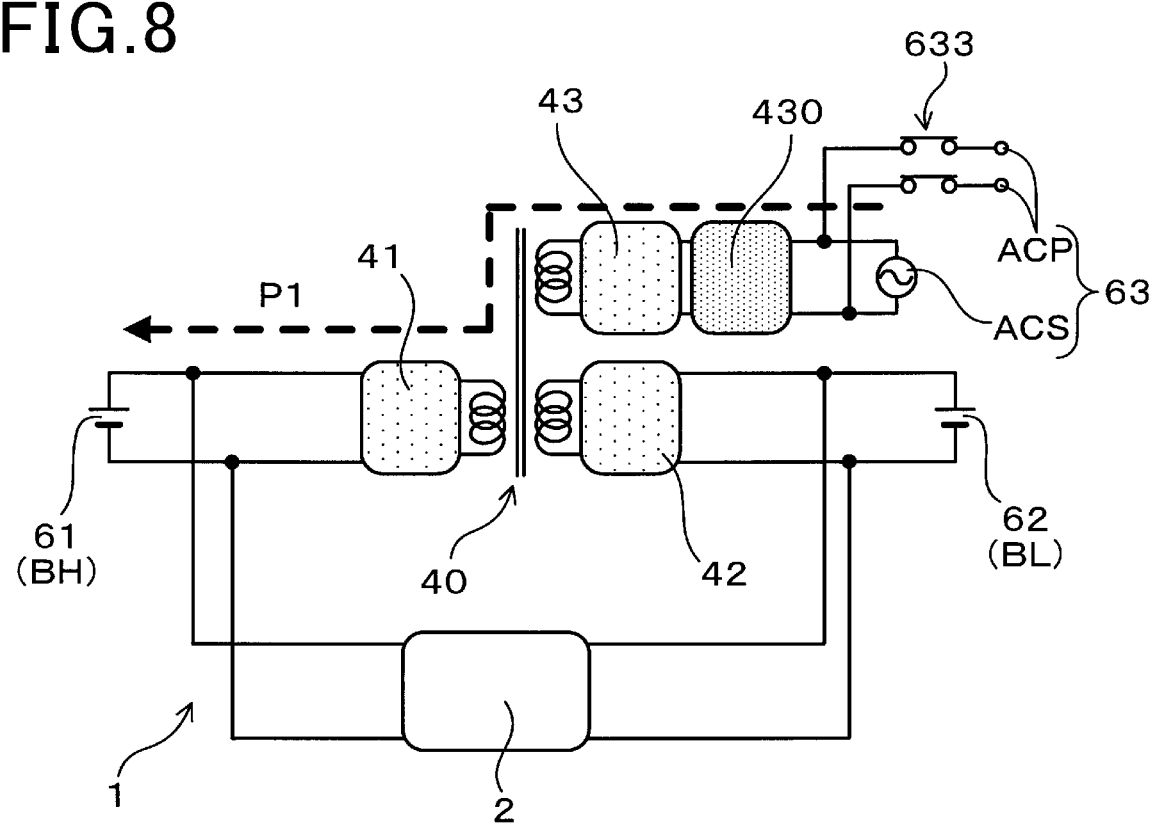
FIG. 8 is an explanatory diagram illustrating operation of charging a high-voltage battery in the electric power conversion apparatus according to the fourth embodiment.
Figure 9:
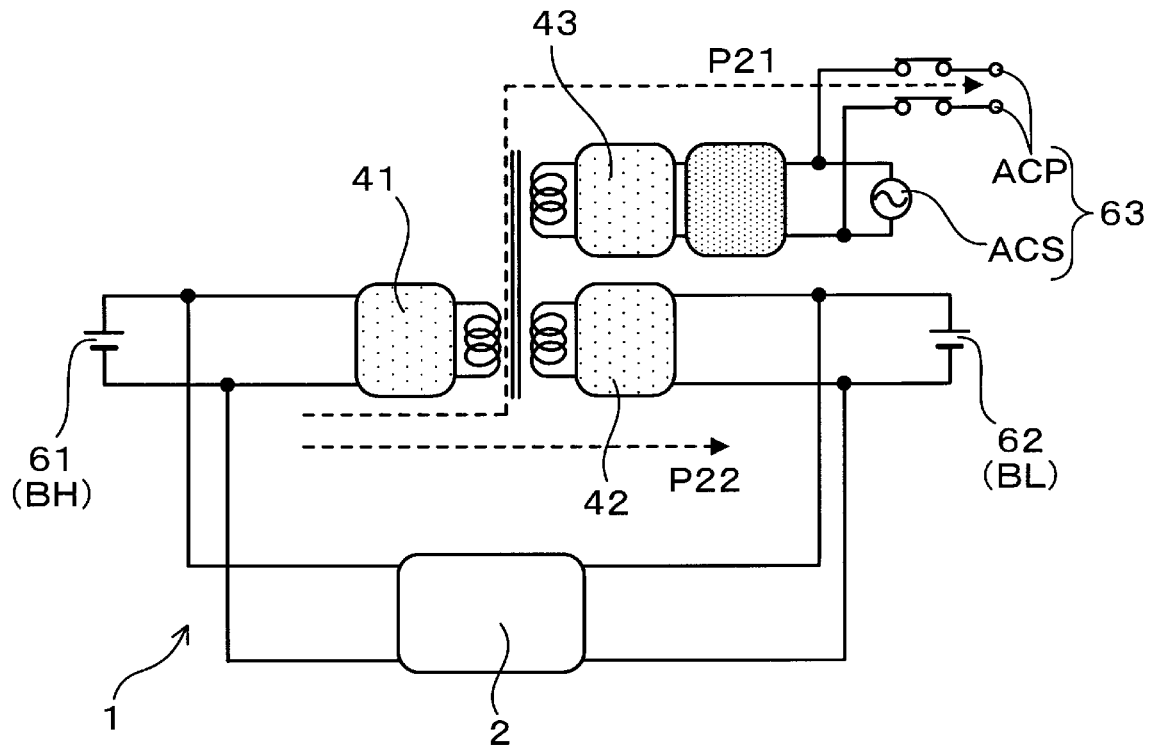
FIG. 9 is an explanatory diagram illustrating operation of an auxiliary DC-to-DC converter in the electric power conversion apparatus according to the fourth embodiment.

As shown in FIGS. 7-9, in an electric power conversion apparatus 1 according to the fourth embodiment, the third-voltage section 63, which is connected with the electric power conversion section 31 of the electric power conversion unit 3, is constituted of a power supply for charging.

Specifically, in the present embodiment, the electric power conversion section 31 is configured to be capable of converting electric power outputted from the power supply (i.e., the third-voltage section 63) into charging electric power and charging the high-voltage battery BH (i.e., the first-voltage section 61) with the resultant charging electric power.

In the present embodiment, the power supply constituting the third-voltage section 63 is implemented by an AC power supply ACS. The AC power supply ACS may be, for example, an AC charger such as a power supply station. In addition, it should be noted that the power supply constituting the third-voltage section 63 may alternatively be implemented by a DC power supply.

Moreover, in the present embodiment, the third-voltage section 63 has an AC output port ACP connected in parallel with the AC power supply ACS. Both the AC power supply ACS and the AC output port ACP are configured to be capable of inputting and outputting alternating current whose effective voltage is, for example, 100V. In addition, in the AC output port ACP, there is provided a relay 633 capable of making and breaking electrical connection.

Furthermore, in the present embodiment, between the third switching circuit section 43 and the third-voltage section 63, there is connected a PFC (Power Factor Correction) circuit 430. In addition, it should be noted that the PFC circuit 430 may be omitted from the electric power conversion apparatus 1 according to the present embodiment.

In the electric power conversion apparatus 1 according to the present embodiment, as indicated by an arrow P1 in FIG. 8, it is possible to convert AC power outputted from the AC power supply ACS (i.e., the third-voltage section 63) into DC power by the electric power conversion section 31 and charge the high-voltage battery BH (i.e., the first-voltage section 61) with the resultant DC power. Moreover, as indicated by an arrow P21 in FIG. 9, it is also possible to convert DC power outputted from the high-voltage battery BH into AC power by the electric power conversion section 31 and output the resultant AC power via the AC output port ACP. In the above manner, it is possible to perform bidirectional exchange of electric power between the first-voltage section 61 and the third-voltage section 63 via the electric power conversion section 31.

The charging of the high-voltage battery BH with electric power from the AC power supply ACS is performed when the vehicle is in a stopped state. In this case, the electric power converted by the electric power conversion section 31 is in the range of, for example, from several kilowatts to several tens of kilowatts. In contrast, during traveling of the vehicle, the charging of the high-voltage battery BH is not performed.

Instead, during traveling of the vehicle, electric power may be supplied from the high-voltage battery BH to an electrical load that is connected to the AC output port ACP. In this case, the electric power converted by the electric power conversion section 31 is, for example, lower than or equal to 1.5 kW.

That is, in the present embodiment, the electric power conversion section 31 is configured to selectively operate in a first operation mode and a second operation mode. In the first operation mode, the electric power conversion section 31 converts AC power outputted from the AC power supply ACS into DC power. In contrast, in the second operation mode, the electric power conversion section 31 converts DC power outputted from the high-voltage battery BH into AC power. Moreover, the electric power converted by the electric power conversion section 31 is lower in the second operation mode than in the first operation mode.

Accordingly, in the present embodiment, during operation of the electric power conversion section 31 in the second operation mode, the auxiliary DC-to-DC converter 32 operates to perform voltage conversion between the first-voltage section 61 and the second-voltage section 62.

Specifically, as shown in FIG. 8, when the vehicle is in the stopped state, the electric power conversion section 31 operates in the first operation state to convert AC power outputted from the AC power supply ACS (i.e., the third-voltage section 63) into DC power; then the high-voltage battery BH (i.e., the first-voltage section 61) is charged with the resultant DC power. In contrast, as shown in FIG. 9, during traveling of the vehicle, the electric power conversion section 31 operates in the second operation mode to convert DC power outputted from the high-voltage battery BH (i.e., the first-voltage section 61) into AC power; then the resultant AC power is outputted via the AC output port ACP (i.e., the third-voltage section 63).

Moreover, as described above, the electric power converted by the electric power conversion section 31 is lower in the second operation mode than in the first operation mode. That is, the electric power converted and supplied in the direction indicated by the arrow P21 in FIG. 9 is lower than the electric power converted and supplied in the direction indicated by the arrow P1 in FIG. 8. Therefore, during operation of the electric power conversion section 31 in the second operation mode, there is an excess of the rated electric power of the common configuration section 33 in the electric power conversion unit 3 over the AC power outputted via the AC output port ACP (i.e., the third-voltage section 63). Accordingly, during operation of the electric power conversion section 31 in the second operation mode, the auxiliary DC-to-DC converter 32 operates to cause DC power to be supplied from the high-voltage battery BH (i.e., the first-voltage section 61) to the low-voltage battery BL (i.e., the second-voltage section 62) through the voltage step-down by the auxiliary DC-to-DC converter 32. Consequently, during traveling of the vehicle, it is possible to supply electric power to the second-voltage section 62 in the direction indicated by an arrow P22 in FIG. 9 while supplying electric power to the third-voltage section 63 in the direction indicated by the arrow P21 in FIG. 9.

As above, in the present embodiment, during operation of the electric power conversion section 31 in the second operation mode, it is possible to supply electric power to the second-voltage section 62 (i.e., the low-voltage battery BL) by utilizing the excess of the rated electric power of the common configuration section 33. Consequently, it becomes possible to secure redundancy of the supply of electric power to the second-voltage section 62 during traveling of the vehicle while suppressing increase in the scale of the electric power conversion unit 3. Moreover, when the main DC-to-DC converter 2 is in a normal state (i.e., in a state where no abnormality (or failure) has occurred therein), it is possible to supply electric power to the second-voltage section 62 via both the main DC-to-DC converter 2 and the auxiliary DC-to-DC converter 32. In addition, the scale of the electric power conversion unit 3 may be represented by, for example, the parts count and/or the overall size.

Moreover, according to the present embodiment, it is also possible to achieve the same advantageous effects as described in the first and second embodiments.

Fifth Embodiment

Figure 10:
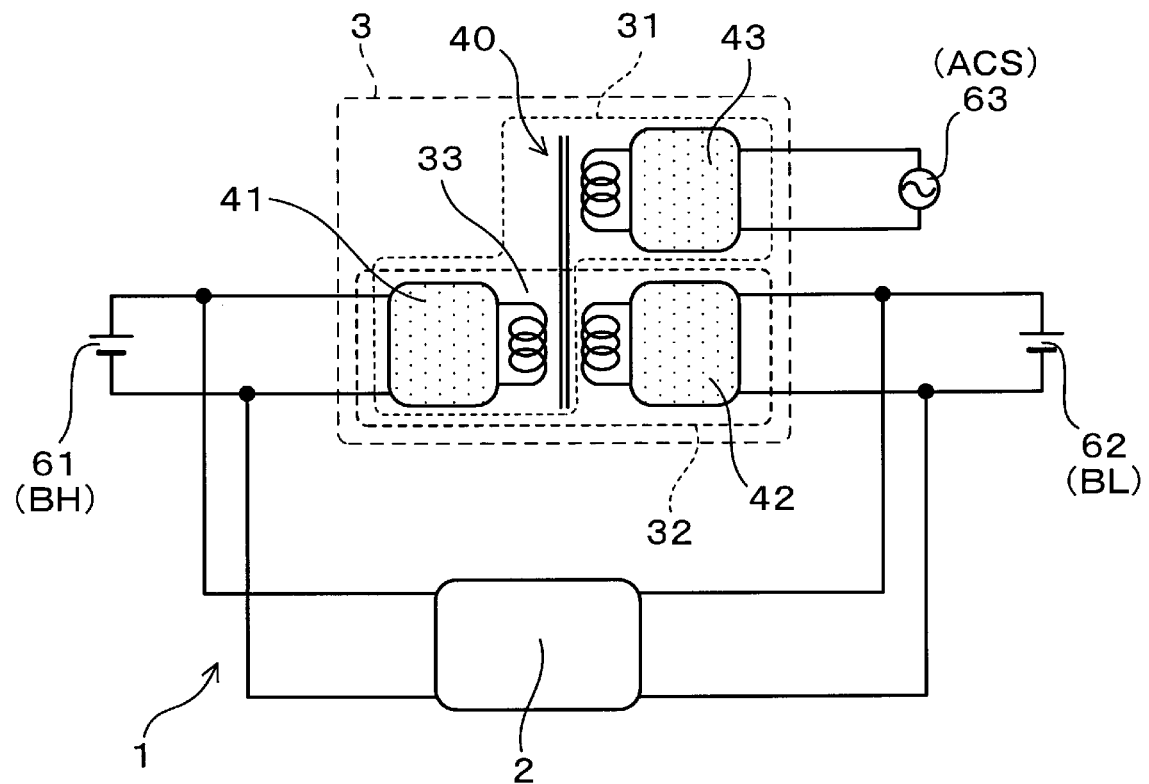
FIG. 10 is a circuit configuration diagram of an electric power conversion apparatus according to a fifth embodiment.
Figure 11:
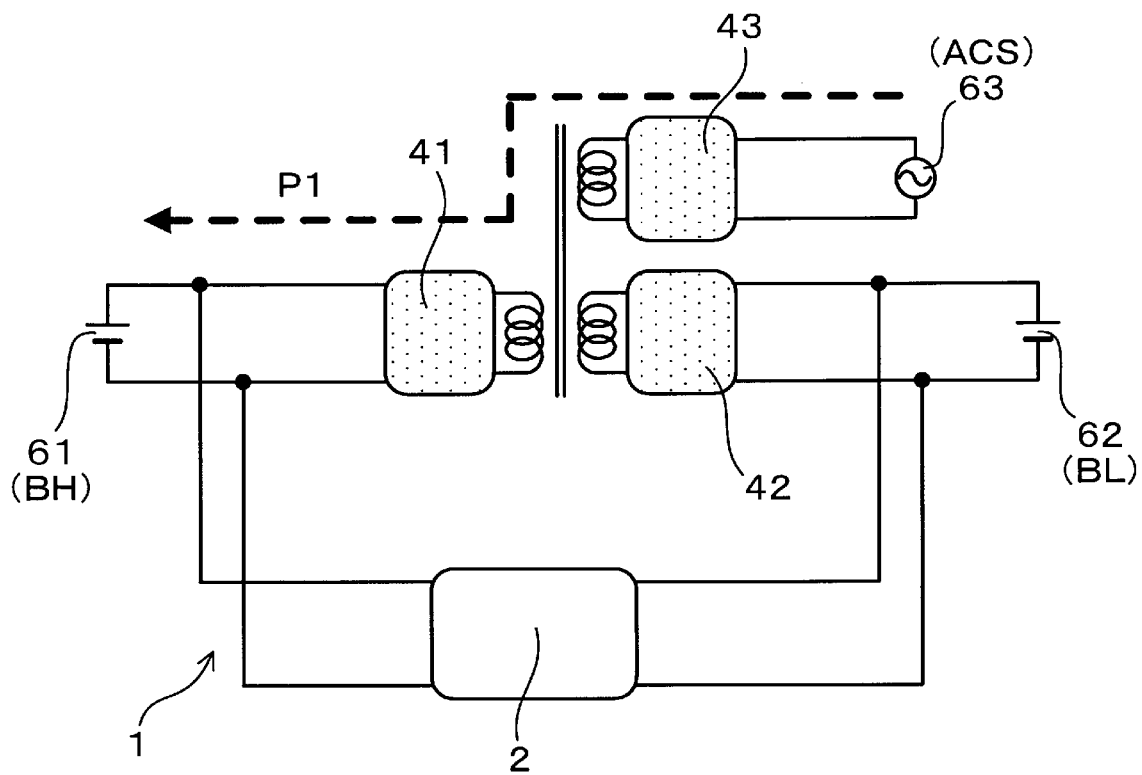
FIG. 11 is an explanatory diagram illustrating operation of charging a high-voltage battery in the electric power conversion apparatus according to the fifth embodiment.
Figure 12:
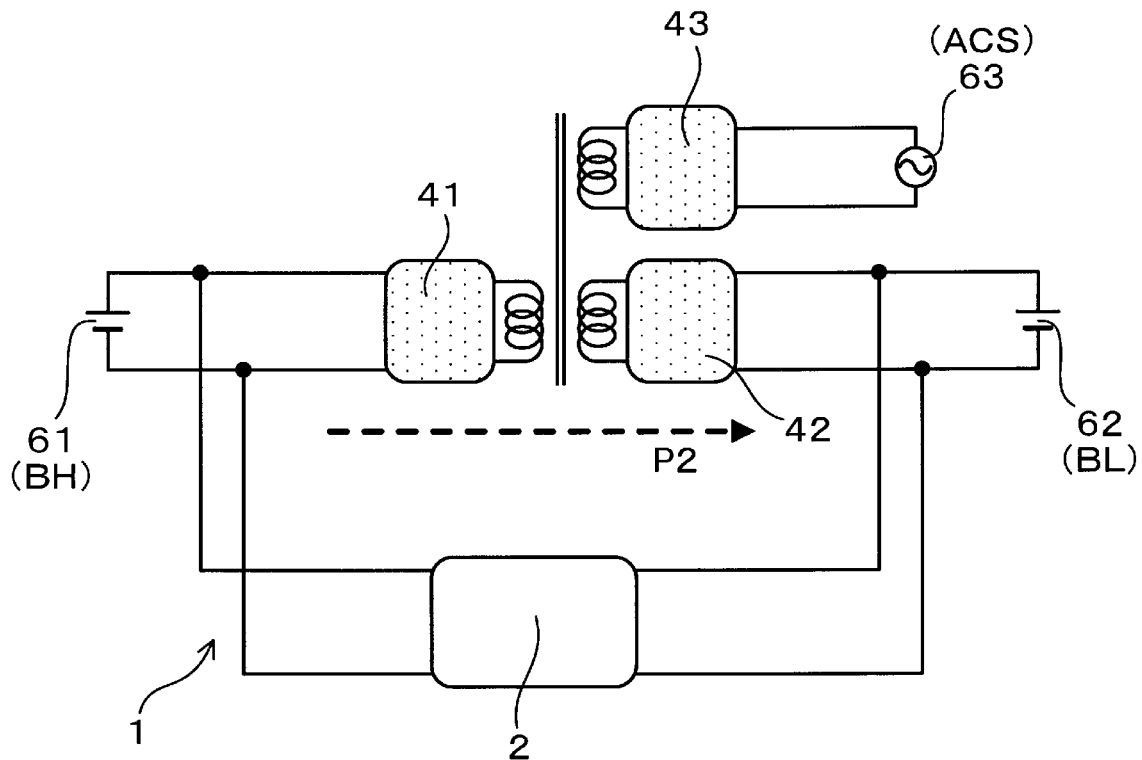
FIG. 12 is an explanatory diagram illustrating operation of an auxiliary DC-to-DC converter in the electric power conversion apparatus according to the fifth embodiment.

As shown in FIGS. 10-12, in an electric power conversion apparatus 1 according to the fifth embodiment, the third-voltage section 63, which is connected with the electric power conversion section 31 of the electric power conversion unit 3, is constituted of a power supply for charging.

In the present embodiment, the power supply constituting the third-voltage section 63 is implemented by an AC power supply ACS. The AC power supply ACS may be, for example, an AC charger. In addition, it should be noted that the power supply constituting the third-voltage section 63 may alternatively be implemented by a DC power supply (e.g., a DC charger) or a stationary contactless charger.

In the electric power conversion apparatus 1 according to the present embodiment, as indicated by an arrow P1 in FIG. 11, the charging of the high-voltage battery BH (i.e., the first-voltage section 61) is performed, via the electric power conversion section 31, with electric power from the AC power supply ACS.

Moreover, when the electric power conversion section 31 is in a non-operating state (i.e., a state where it does not the electric power conversion), the auxiliary DC-to-DC converter 32 operates to perform voltage conversion between the first-voltage section 61 and the second-voltage section 62, as indicated by an arrow P2 in FIG. 12.

Specifically, when the vehicle is in a stopped state, as indicated by the arrow P1 in FIG. 11, AC power outputted from the AC power supply ACS (i.e., the third-voltage section 63) is converted into DC power by the electric power conversion section 31; then the high-voltage battery BH (i.e., the first-voltage section 61) is charged with the resultant DC power. On the other hand, during traveling of the vehicle, the electric power conversion section 31 does not operate and thus the charging of the high-voltage battery BH is not performed. Instead, as indicated by the arrow P2 in FIG. 12, the auxiliary DC-to-DC converter 32, which shares the common configuration section 33 with the electric power conversion section 31, operates to cause DC power to be supplied from the high-voltage battery BH to the low-voltage battery BL (i.e., the second-voltage section 62) through the voltage step-down by the auxiliary DC-to-DC converter 32.

In the electric power conversion apparatus 1 according to the present embodiment, no AC output port ACP is provided unlike in the electric power conversion apparatus 1 according to the fourth embodiment. Moreover, in the electric power conversion apparatus 1 according to the present embodiment, no PFC circuit is provided unlike in the electric power conversion apparatus 1 according to the fourth embodiment. However, it should be noted that the electric power conversion apparatus 1 according to the present embodiment may also have a PFC circuit provided therein.

As above, in the present embodiment, it is possible to supply electric power from the first-voltage section 61 to the second-voltage section 62 by utilizing the common configuration section 33 which is part of the electric power conversion section 31 that does not perform the electric power conversion during traveling of the vehicle. Consequently, it becomes possible to secure redundancy of the supply of electric power to the second-voltage section 62 during traveling of the vehicle while suppressing increase in the scale of the electric power conversion unit 3. Moreover, when the main DC-to-DC converter 2 is in the normal state, it is possible to supply electric power to the second-voltage section 62 via both the main DC-to-DC converter 2 and the auxiliary DC-to-DC converter 32.

In addition, according to the present embodiment, it is also possible to achieve the same advantageous effects as described in the first and second embodiments.

Sixth Embodiment

Figure 13:
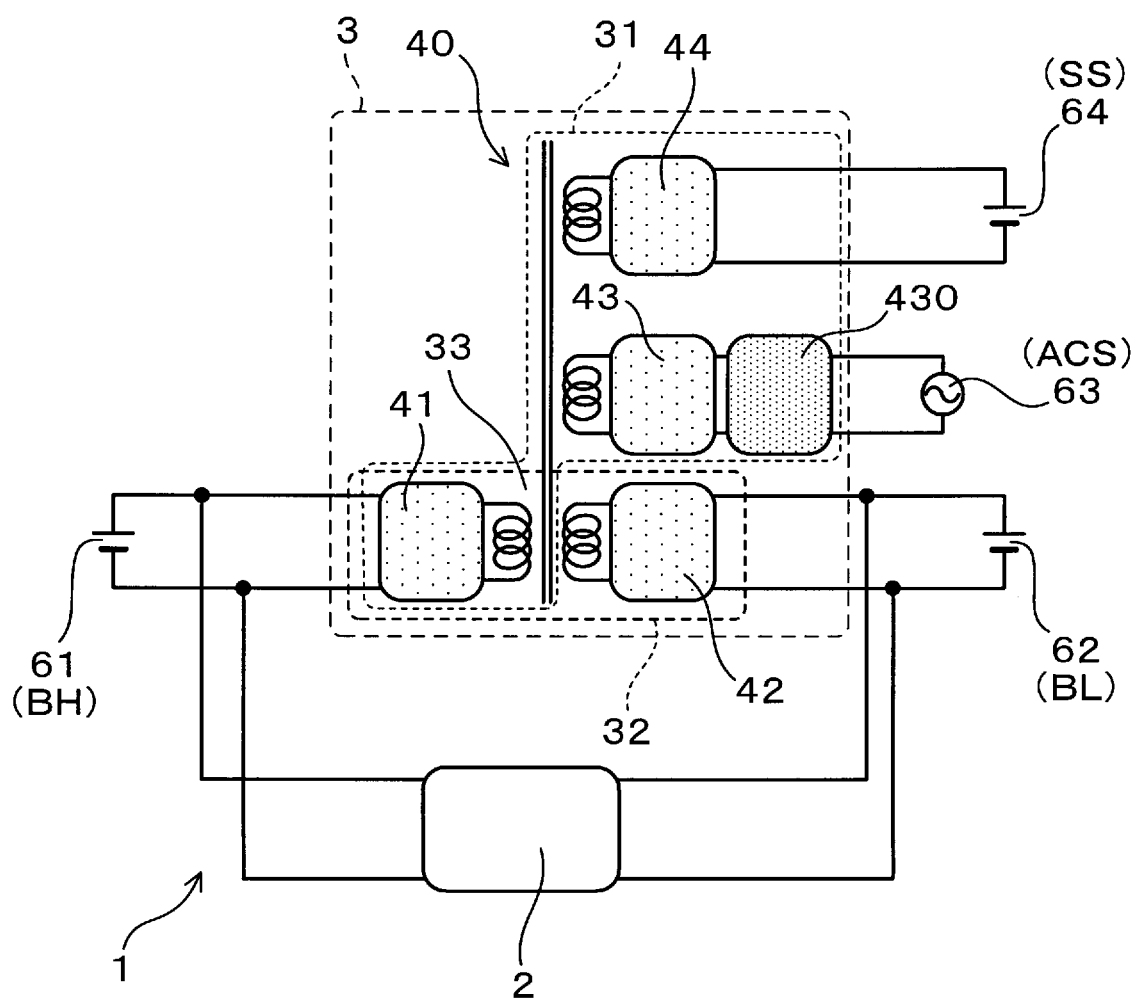
FIG. 13 is a circuit configuration diagram of an electric power conversion apparatus according to a sixth embodiment.
Figure 14:
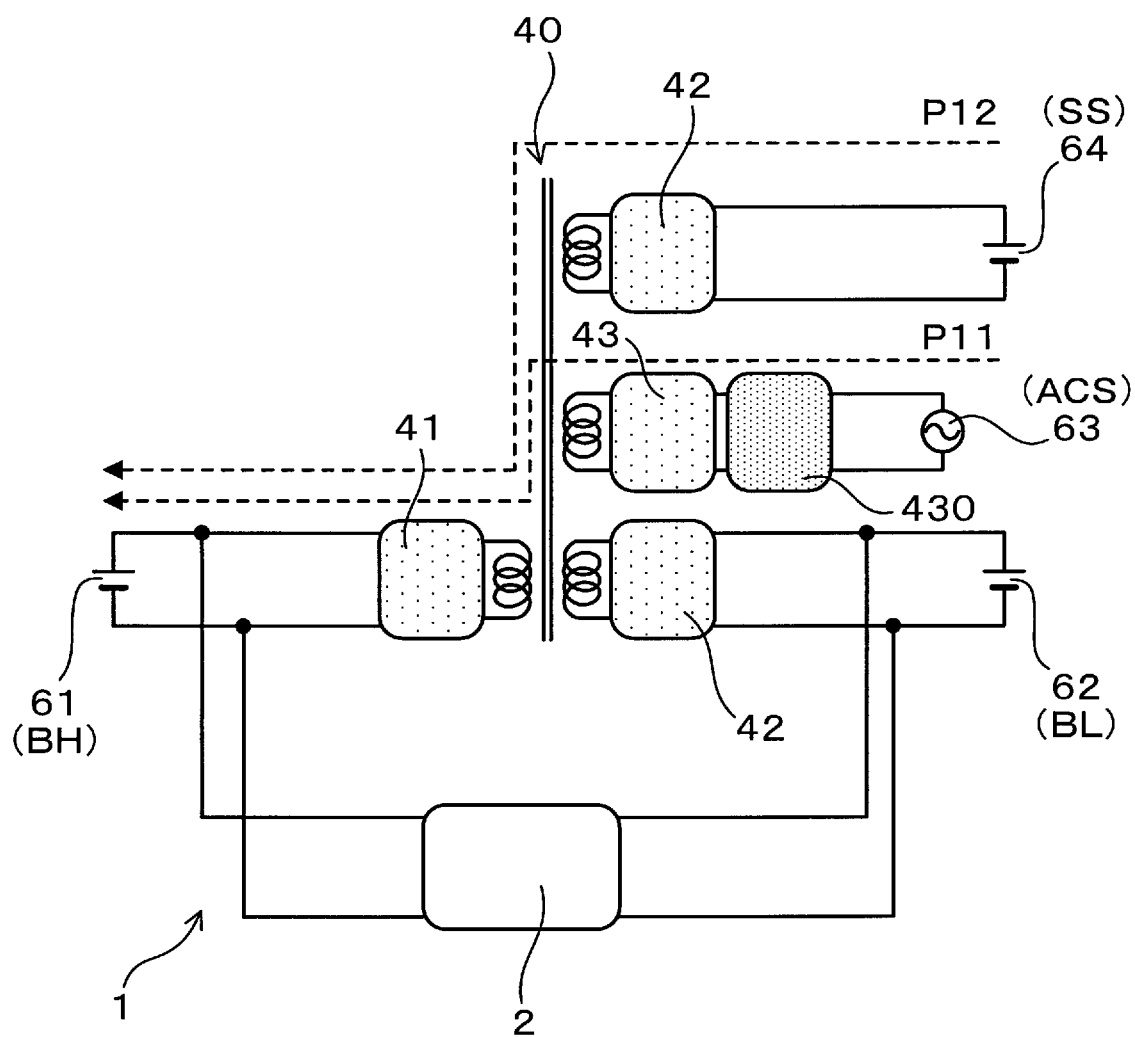
FIG. 14 is an explanatory diagram illustrating operation of charging a high-voltage battery in the electric power conversion apparatus according to the sixth embodiment.
Figure 15:
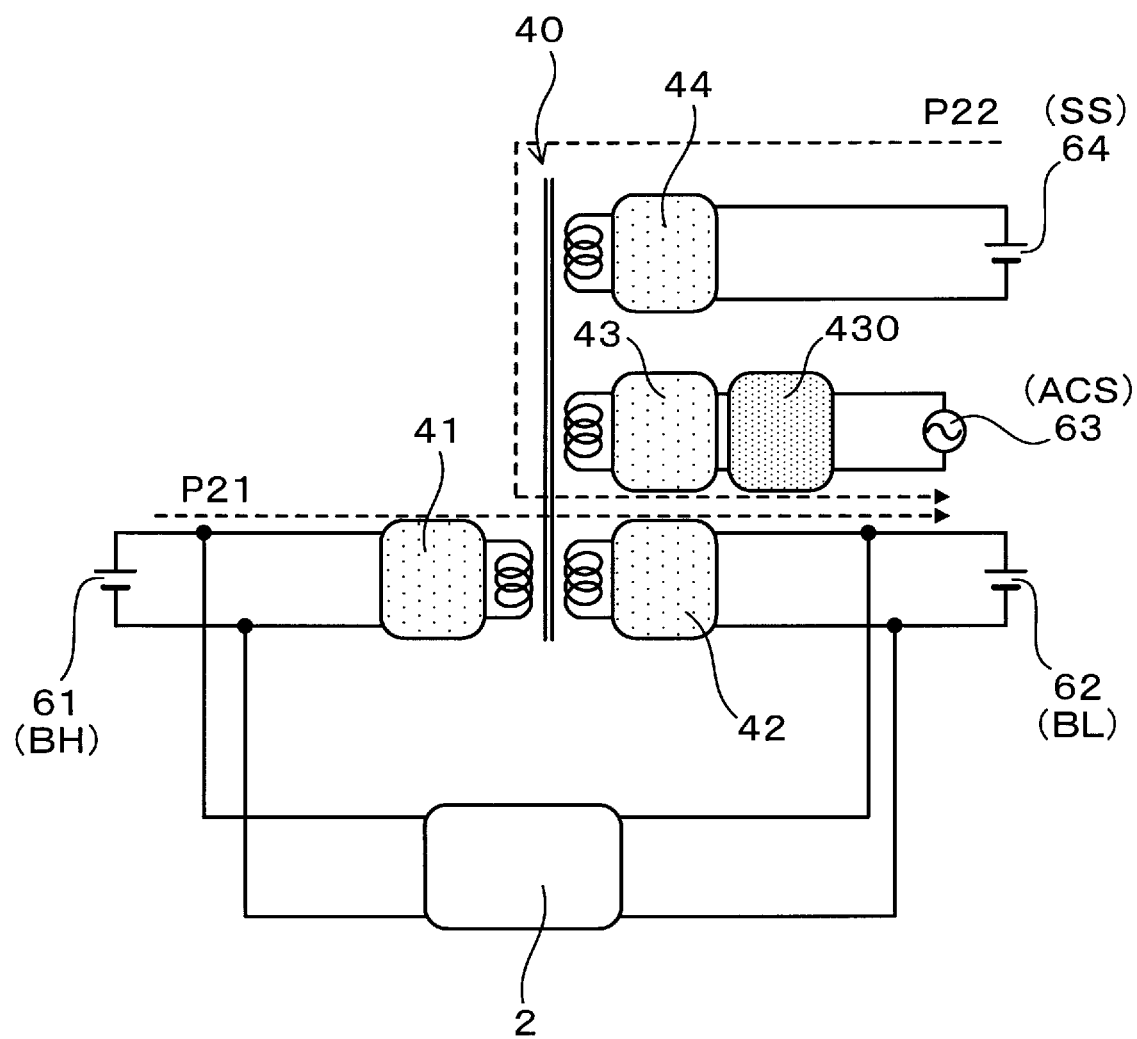
FIG. 15 is an explanatory diagram illustrating operation of an auxiliary DC-to-DC converter in the electric power conversion apparatus according to the sixth embodiment.

As shown in FIGS. 13-15, in an electric power conversion apparatus 1 according to the sixth embodiment, to the electric power conversion unit 3, there is further connected a fourth-voltage section 64, which operates at a fourth voltage, in addition to the first-voltage section 61, the second-voltage section 62 and the third-voltage section 63 described in the previous embodiments.

Specifically, in the present embodiment, as shown in FIG. 13, the multi-port transformer 40 has four coils magnetically coupled with each other. Moreover, to the multi-port transformer 40, there is further connected a fourth switching circuit section 44 in addition to the first, second and third switching circuit sections 41, 42 and 43 described in the previous embodiments. To the fourth switching circuit section 44, there is connected the fourth-voltage section 64.

In the present embodiment, the fourth-voltage section 64 is constituted of a solar power supply SS. The solar power supply SS may be, for example, a solar power generator that includes solar panels arranged on the roof of the vehicle.

Moreover, in the present embodiment, between the third switching circuit section 43 and the third-voltage section 63, there is connected the PFC circuit 430 as in the fourth embodiment.

In addition, as components of the electric power conversion apparatus 1, the third-voltage section 63 and the fourth-voltage section 64 can be replaced with each other in interpretation. That is, the AC power supply ACS can be interpreted (or regarded) as the fourth-voltage section 64 and the solar power supply SS can be interpreted as the third-voltage section 63.

In the electric power conversion apparatus 1 according to the present embodiment, as indicated by arrows P11 and P12 in FIG. 14, during the charging of the high-voltage battery BH (i.e., the first-voltage section 61) with electric power from the AC power supply ACS (i.e., the third-voltage section 63), electric power generated by the solar power supply SS (i.e., the fourth-voltage section 64) can also be supplied to the high-voltage battery BH.

Moreover, as indicated by arrows P21 and P22 in FIG. 15, during the supply of electric power from the high-voltage battery BH (i.e., the first-voltage section 61) to the low-voltage battery BL (i.e., the second-voltage section 62) via the auxiliary DC-to-DC converter 32, electric power generated by the solar power supply SS (i.e., the fourth-voltage section 64) can also be supplied to the low-voltage battery BL. Consequently, part of the electric power which otherwise would be all supplied by the first-voltage section 61 can be supplied by the fourth-voltage section 64 instead.

In addition, according to the present embodiment, it is also possible to achieve the same advantageous effects as described in the first, second and fifth embodiments.

Seventh Embodiment

Figure 16:
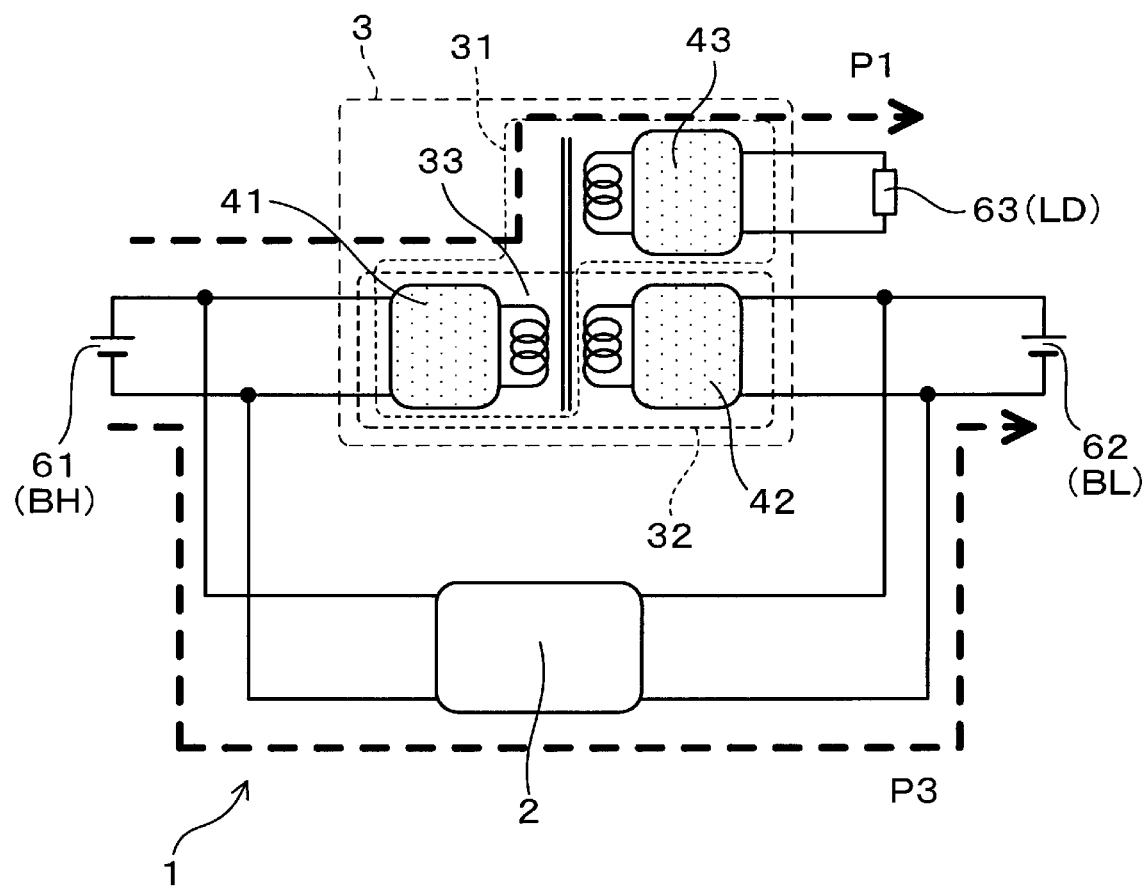
FIG. 16 is a circuit configuration diagram of an electric power conversion apparatus according to a seventh embodiment, illustrating the flow of electric power in the electric power conversion apparatus when a main DC-to-DC converter is in a normal state.
Figure 17:
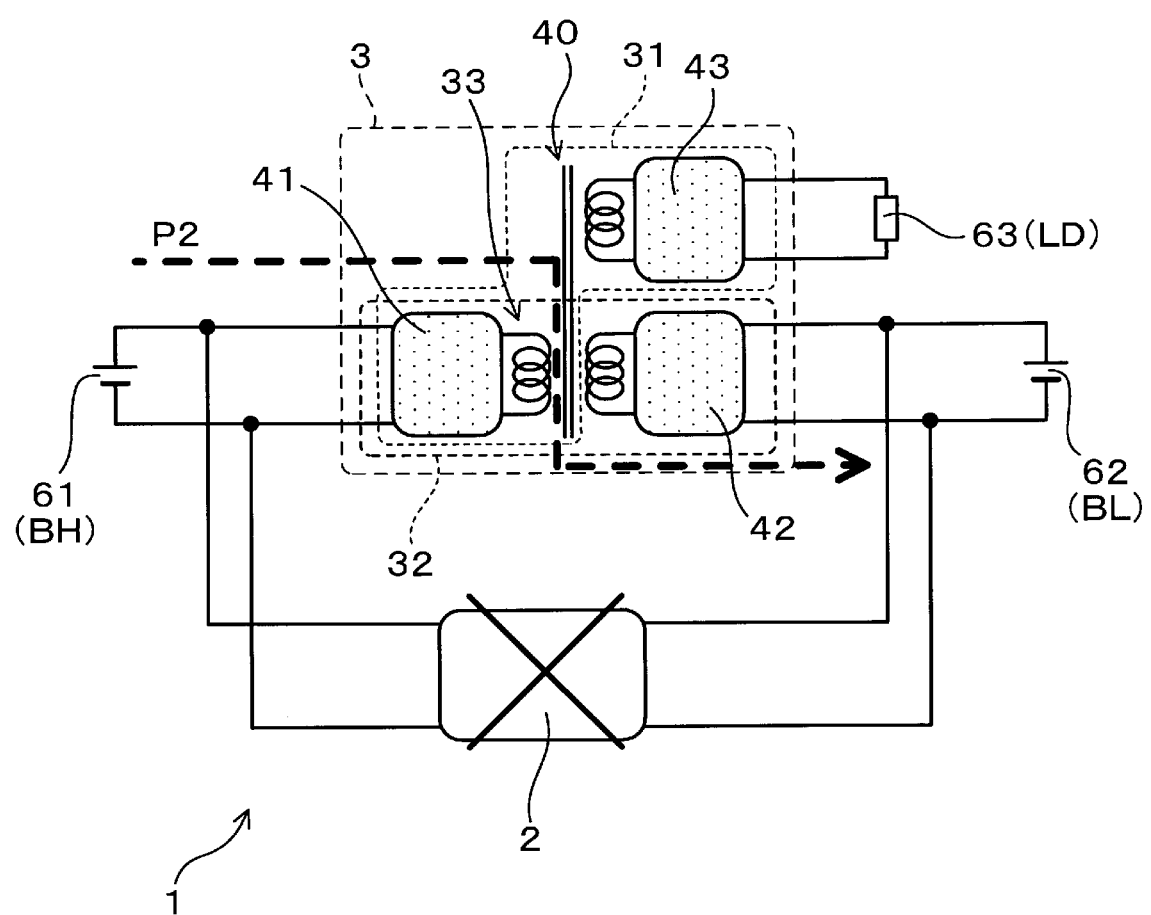
FIG. 17 is an explanatory diagram illustrating operation of an auxiliary DC-to-DC converter in the electric power conversion apparatus according to the seventh embodiment.

As shown in FIGS. 16 and 17, in an electric power conversion apparatus 1 according to the seventh embodiment, operation of the electric power conversion section 31 is stopped upon occurrence of any abnormality in the main DC-to-DC converter 2.

That is, in the present embodiment, the supply of electric power from the first-voltage section 61 to the third-voltage section 63 via the electric power conversion section 31 can be completely stopped.

Specifically, when the main DC-to-DC converter 2 is in the normal state, electric power conversion between the first-voltage section 61 and the second-voltage section 62 can be performed by the main DC-to-DC converter 2, as indicated by an arrow P3 in FIG. 16. Moreover, electric power conversion between the first-voltage section 61 and the third-voltage section 63 can be performed by the electric power conversion section 31 of the electric power conversion unit 3, as indicated by an arrow P1 in FIG. 16. In addition, when the main DC-to-DC converter 2 is in the normal state, it is unnecessary for the auxiliary DC-to-DC converter 32 to operate.

In contrast, when the main DC-to-DC converter 2 becomes unable to operate normally due to, for example, an abnormally occurring therein, electric power conversion between the first-voltage section 61 and the second-voltage section 62 can be performed by the auxiliary DC-to-DC converter 32 instead, as indicated by an arrow P2 in FIG. 17. In addition, when it is required to supply sufficient electric power to the low-voltage battery BL (i.e., the second-voltage section 62), it is preferable to stop electric power supply to the third-voltage section 63.

Accordingly, in the above situation, as shown in FIG. 17, operation of the electric power conversion section 31 is stopped while the auxiliary DC-to-DC converter 32 operates to supply electric power to the low-voltage battery BL (i.e., the second-voltage section 62).

Moreover, to allow or facilitate the above control, it is preferable that the influence of the stopping of electric power supply to the third-voltage section 63 on traveling of the vehicle is small. Accordingly, the electrical loads LD constituting the third-voltage section 63 are preferably such that operation of the electrical loads LD has no or only small influence on traveling of the vehicle. Such electrical loads LD include, for example, a heater, an audio device, an interior roof lamp and an air conditioner.

In addition, the electrical loads LD may include a heater for heating an electrically-heated catalyst provided in the exhaust system of a hybrid vehicle. In this case, since the heating of the catalyst by the heater is performed only immediately before the engine driving of the hybrid vehicle, the stopping of electric power supply to the heater has no particular influence on traveling of the hybrid vehicle. Moreover, the electrical loads LD may include a heater for heating a seat; in this case, the stopping of electric power supply to the heater has no influence on traveling of the vehicle.

As above, in the present embodiment, it is possible to reliably secure redundancy of the electric power conversion between the first-voltage section 61 and the second-voltage section 62 without influencing traveling of the vehicle. That is, when the main DC-to-DC converter 2 is in an abnormal state (i.e., a state where any abnormality (or failure) has occurred therein), it is still possible to ensure operation of electrical loads connected to the low-voltage battery BL (i.e., the second-voltage section 62).

In addition, according to the present embodiment, it is also possible to achieve the same advantageous effects as described in the first and second embodiments.

Eighth Embodiment

Figure 18:
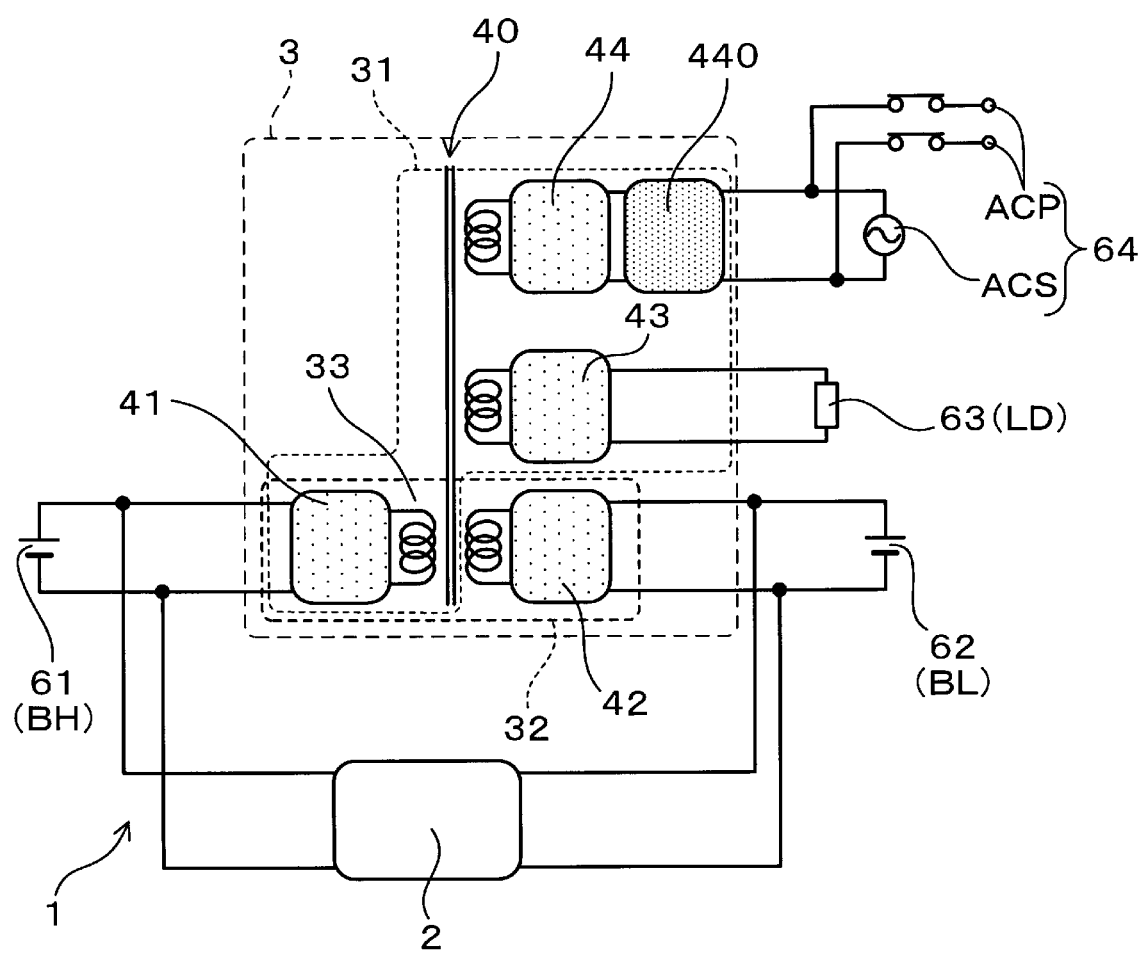
FIG. 18 is a circuit configuration diagram of an electric power conversion apparatus according to an eighth embodiment.

As shown in FIG. 18, in an electric power conversion apparatus 1 according to the eighth embodiment, the fourth-voltage section 64 is constituted of an AC power supply ACS and an AC output port ACP.

Specifically, in the present embodiment, to the electric power conversion unit 3, there are connected the first-voltage section 61, the second-voltage section 62, the third-voltage section 63 and the fourth-voltage section 64 as in the sixth embodiment. However, the third-voltage section 63 and the fourth-voltage section 64 in the present embodiment are respectively different in configuration from those in the sixth embodiment. Moreover, the first-voltage section 61, the second-voltage section 62 and the third-voltage section 63 in the present embodiment are respectively identical to those in the seventh embodiment. Furthermore, in the present embodiment, the AC power supply ACS and the AC output port ACP, which together constitute the fourth-voltage section 64, are connected to the fourth switching circuit section 44 via a PFC (Power Factor Correction) circuit 440. In addition, the fourth switching circuit section 44 and the PFC circuit 440 in the present embodiment are respectively identical to the third switching circuit section 43 and the PFC circuit 430 in the sixth embodiment.

In the present embodiment, operation of the electric power conversion section 31 is stopped upon occurrence of any abnormality (or failure) in the main DC-to-DC converter 2. Consequently, both the supply of electric power from the first-voltage section 61 to the third-voltage section 63 via the electric power conversion section 31 and the supply of electric power from the first-voltage section 61 to the AC output port ACP of the fourth-voltage section 64 via the electric power conversion section 31 are stopped. As a result, it becomes possible to secure redundancy of the supply of electric power from the first-voltage section 61 to the second-voltage section 62.

In addition, according to the present embodiment, it is also possible to achieve the same advantageous effects as described in the first, second and seventh embodiments.

Ninth Embodiment

Figure 19:
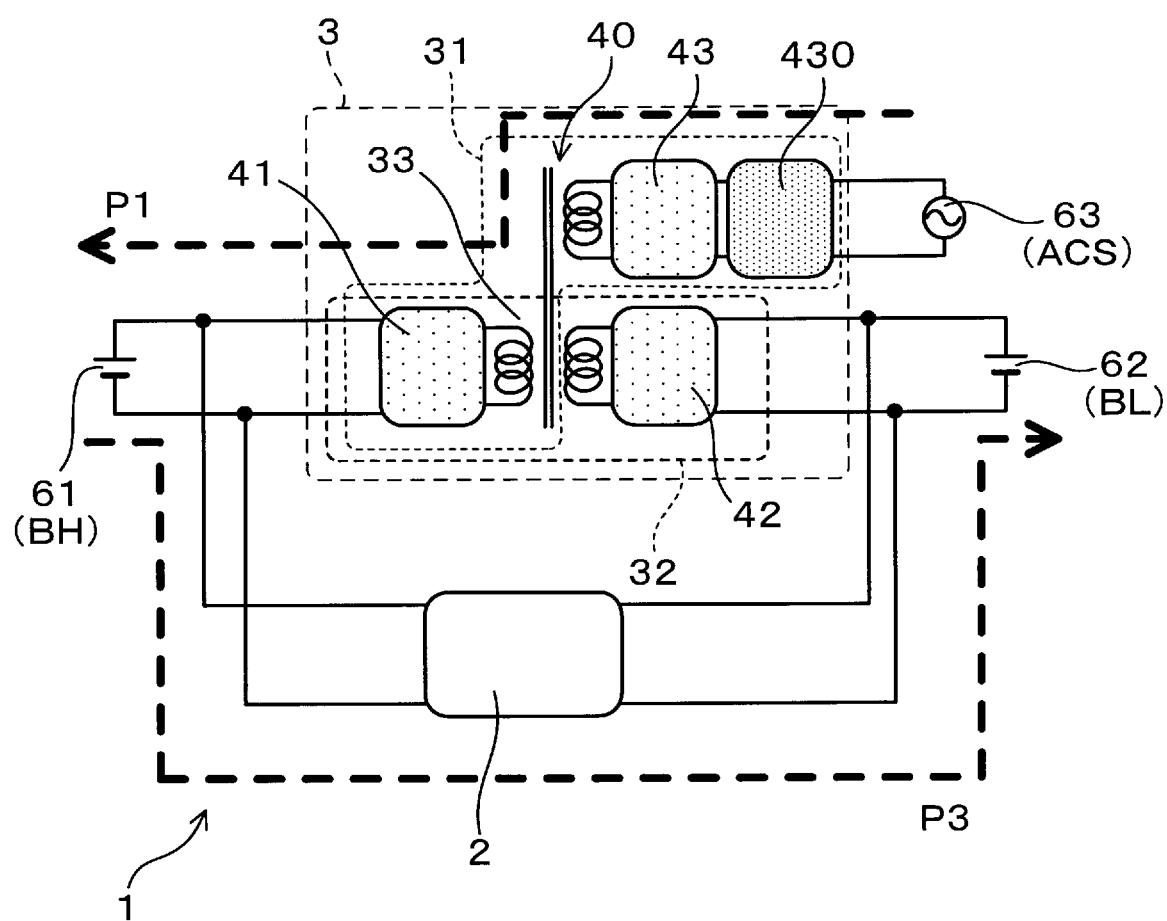
FIG. 19 is a circuit configuration diagram of an electric power conversion apparatus according to a ninth embodiment, illustrating the flow of electric power in the electric power conversion apparatus when a main DC-to-DC converter is in a normal state.
Figure 20:
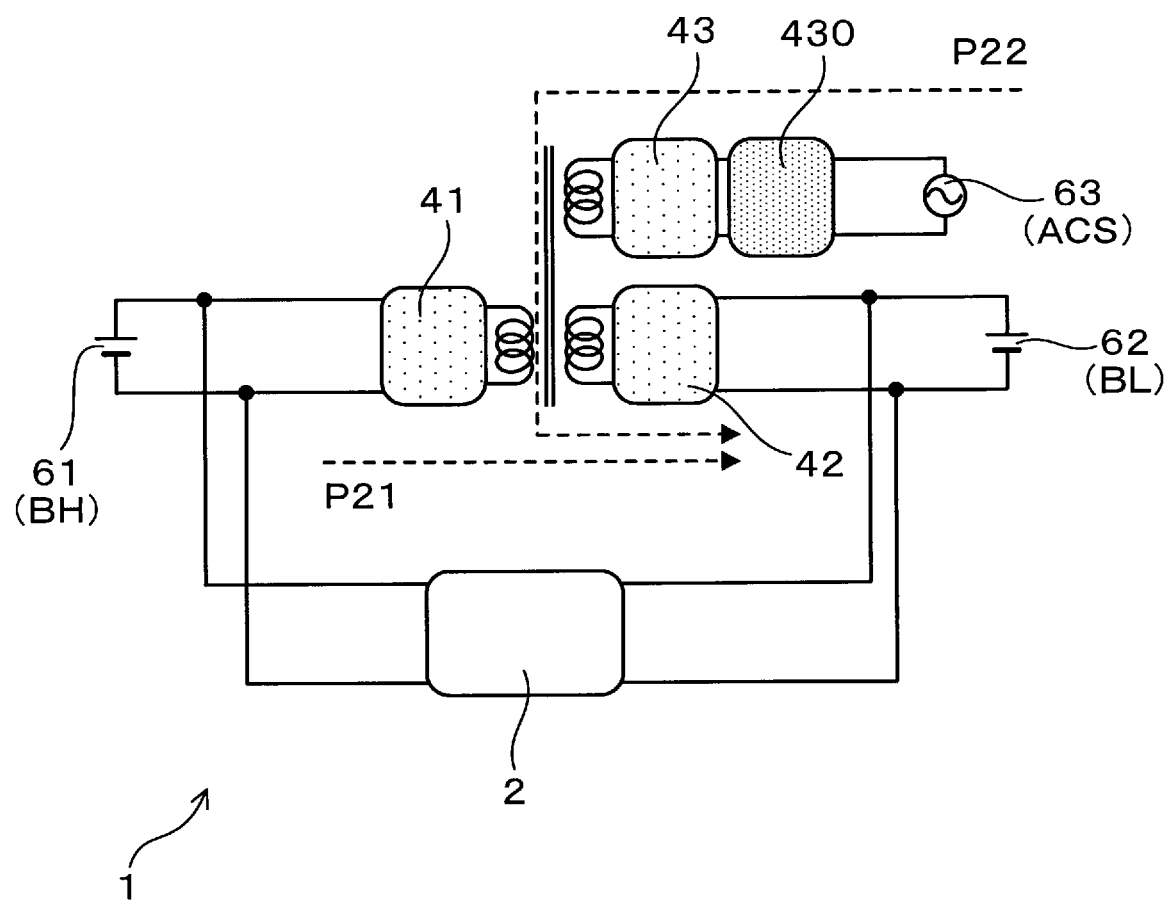
FIG. 20 is an explanatory diagram illustrating operation of an auxiliary DC-to-DC converter in the electric power conversion apparatus according to the ninth embodiment.

As shown in FIGS. 19 and 20, in an electric power conversion apparatus 1 according to the ninth embodiment, the electric power conversion unit 3 is configured to be capable of performing electric power conversion between the AC power supply ACS (i.e., the third-voltage section 63) and the second-voltage section 62.

Specifically, in the present embodiment, when the main DC-to-DC converter 2 is in the normal state, the charging of the low-voltage battery BL (i.e., the second-voltage section 62) is performed, via the main DC-to-DC converter 2, with electric power from the high-voltage battery BH (i.e., the first-voltage section 61), as indicated by an arrow P3 in FIG. 19. Moreover, the charging of the high-voltage battery BH (i.e., the first-voltage section 61) is also performed, via the electric power conversion section 31, with electric power from the AC power supply ACS (i.e., the third-voltage section 63), as indicated by an arrow P1 in FIG. 19.

In contrast, when the main DC-to-DC converter 2 is in the abnormal state, the charging of the low-voltage battery BL (i.e., the second-voltage section 62) is performed, via the auxiliary DC-to-DC converter 32, with electric power from the high-voltage battery BH (i.e., the first-voltage section 61), as indicated by an arrow P21 in FIG. 20. Moreover, electric power is also supplied from the AC power supply ACS (i.e., the third-voltage section 63) to the low-voltage battery BL (i.e., the second-voltage section 62) via the electric power conversion unit 3, as indicated by an arrow P22 in FIG. 20.

More specifically, in the present embodiment, the third switching circuit section 43, the multi-port transformer 40 and the second switching circuit section 42 of the electric power conversion unit 3 together constitute a DC-to-DC converter by which electric power conversion is performed between the third-voltage section 63 and the second-voltage section 62.

As a result, part of the electric power which otherwise would be all supplied by the first-voltage section 61 can be supplied by the third-voltage section 63 instead.

In addition, according to the present embodiment, it is also possible to achieve the same advantageous effects as described in the first, second and fourth embodiments.

Tenth Embodiment

Figure 21:
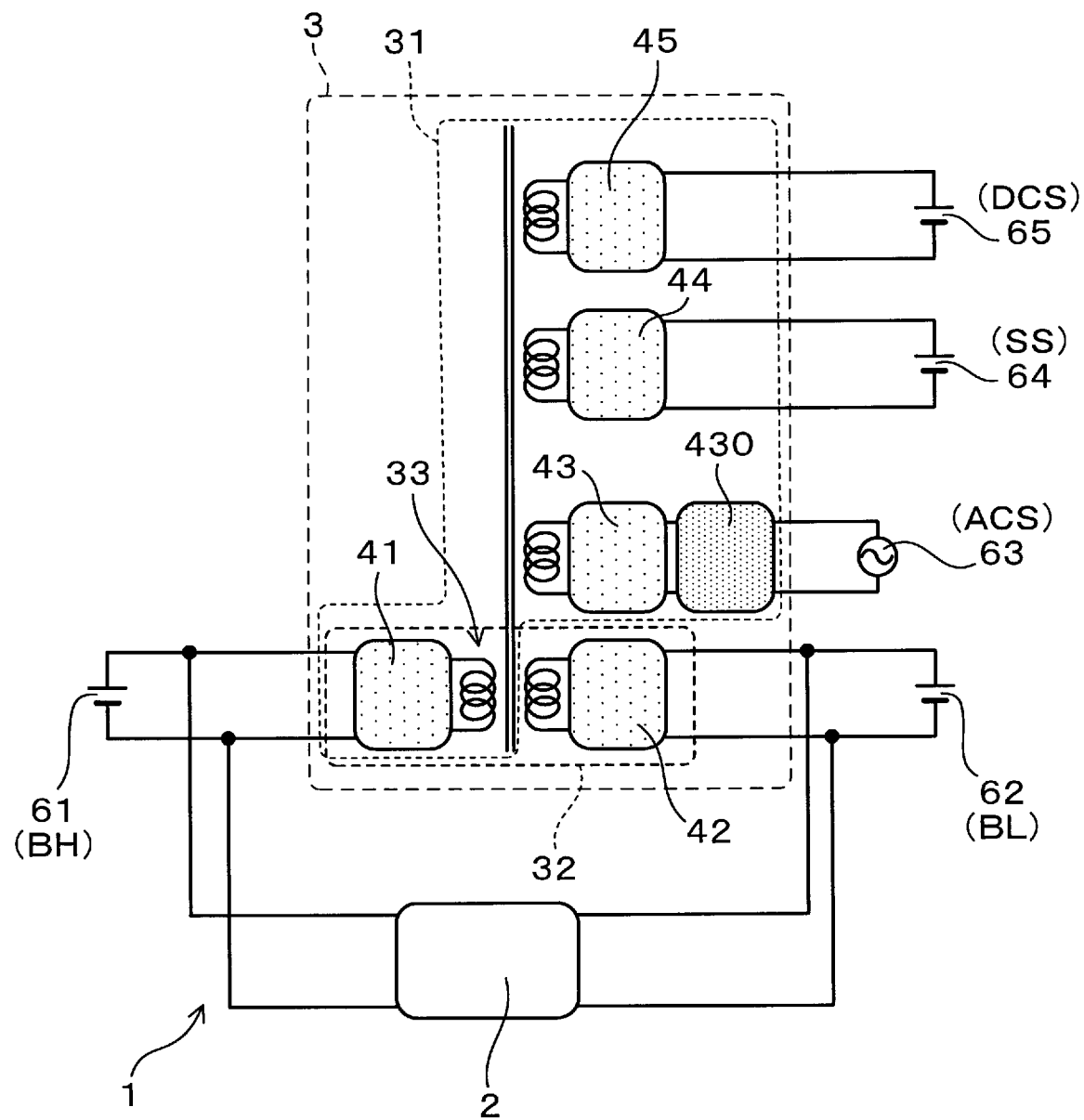
FIG. 21 is a circuit configuration diagram of an electric power conversion apparatus according to a tenth embodiment.

As shown in FIG. 21, in an electric power conversion apparatus 1 according to the tenth embodiment, to the electric power conversion unit 3, there is further connected a fifth-voltage section 65, which operates at a fifth voltage, in addition to the first-voltage section 61, the second-voltage section 62, the third-voltage section 63 and the fourth-voltage section 64 described in the previous embodiments (see, for example, FIG. 13).

In addition, as components of the electric power conversion apparatus 1, the third-voltage section 63, the fourth-voltage section 64 and the fifth-voltage section 65 can be replaced with each other in interpretation.

In the present embodiment, as shown in FIG. 21, the multi-port transformer 40 has five coils magnetically coupled with each other. Moreover, to the multi-port transformer 40, there is further connected a fifth switching circuit section 45 in addition to the first, second, third and fourth switching circuit sections 41, 42, 43 and 44 described in the previous embodiments. To the fifth switching circuit section 45, there is connected the fifth-voltage section 65.

In the present embodiment, the fifth-voltage section 65 is constituted of a DC power supply DCS. The DC power supply DCS may be, for example, a DC charger such as a power supply station.

As above, in the present embodiment, to the electric power conversion unit 3, there can be connected three power supplies, i.e., the AC power supply ACS constituting the third-voltage section 63, the solar power supply SS constituting the fourth-voltage section 64 and the DC power supply DC constituting the fifth-voltage section 65. Consequently, the charging of the high-voltage battery BH (i.e., the first-voltage section 61) can be performed with electric power from any of the three power supplies. Moreover, electric power from any of the three power supplies can also be used to charge the low-voltage battery BL (i.e., the second-voltage section 62).

In addition, according to the present embodiment, it is also possible to achieve the same advantageous effects as described in the first, second, fifth and sixth embodiments.

Eleventh Embodiment

Figure 22:
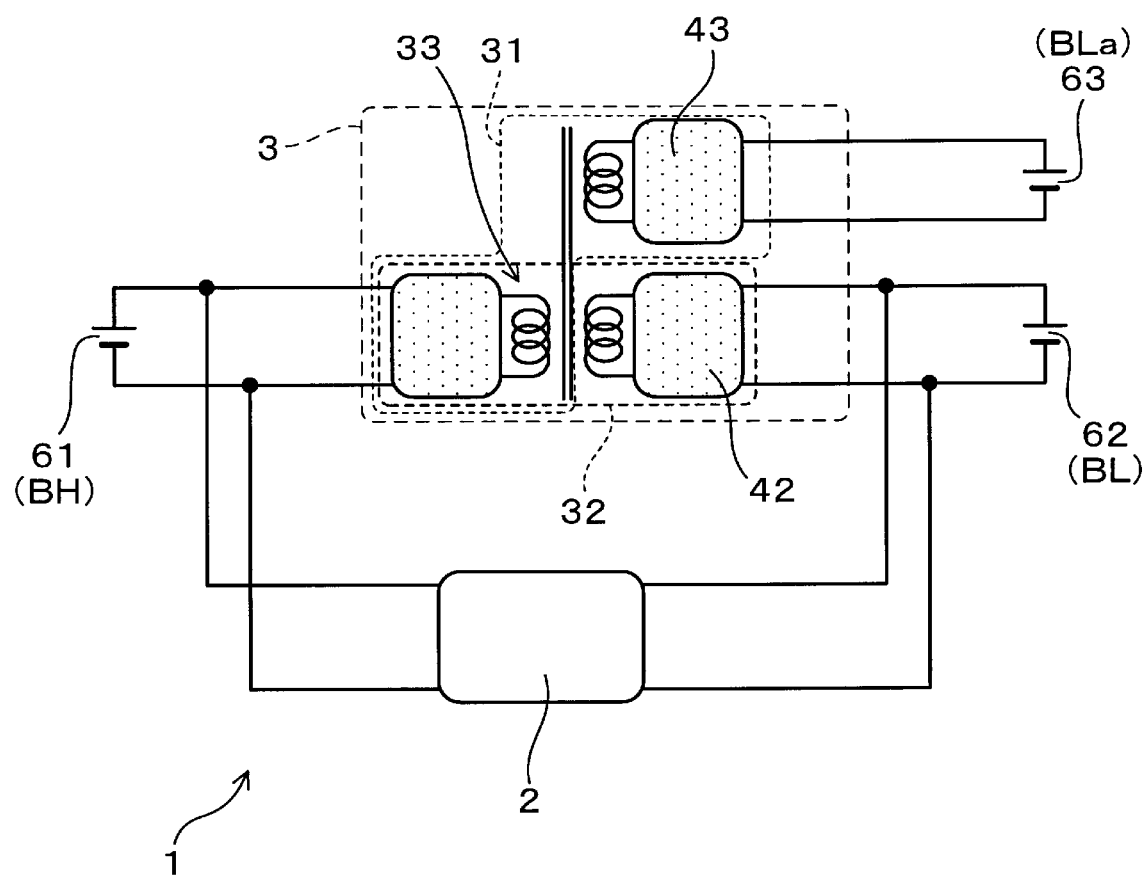
FIG. 22 is a circuit configuration diagram of an electric power conversion apparatus according to an eleventh embodiment.
Figure 23:
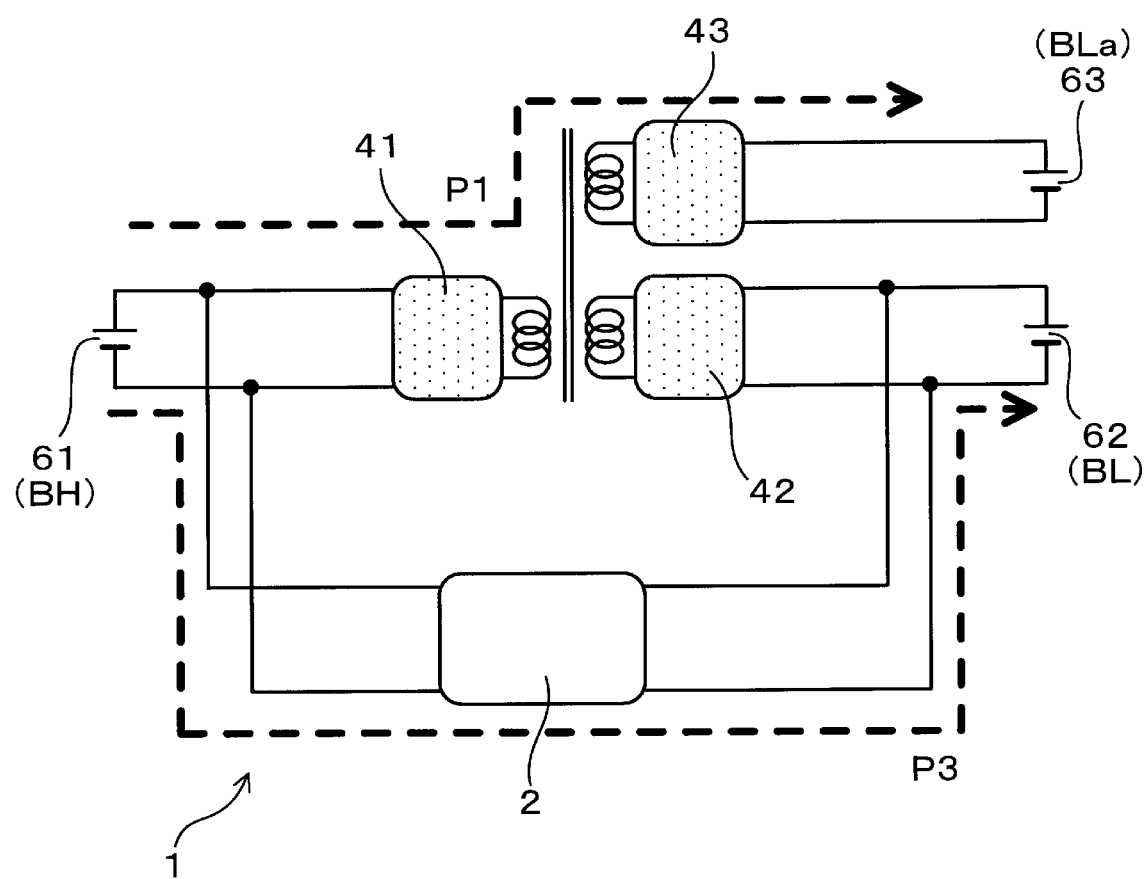
FIG. 23 is an explanatory diagram illustrating the flow of electric power in the electric power conversion apparatus according to the eleventh embodiment when a main DC-to-DC converter is in a normal state.
Figure 24:
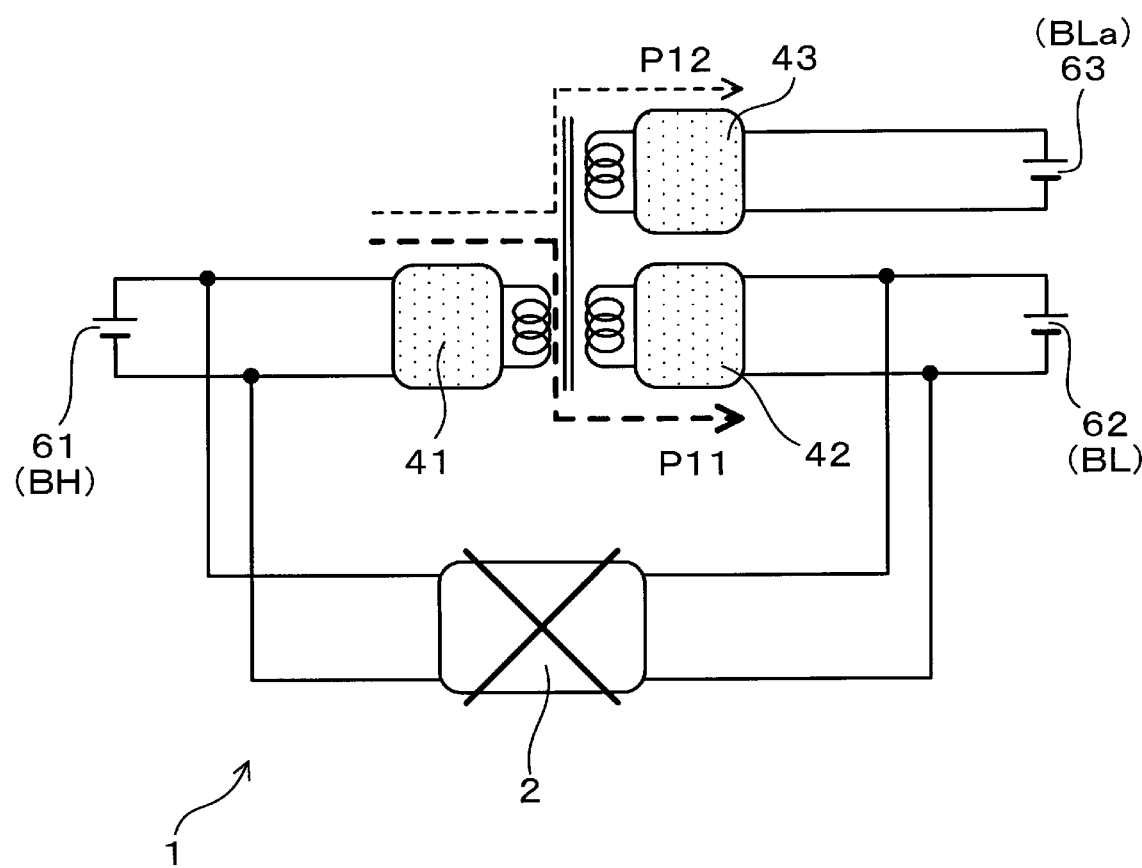
FIG. 24 is an explanatory diagram illustrating operation of an auxiliary DC-to-DC converter in the electric power conversion apparatus according to the eleventh embodiment.

As shown in FIGS. 22-24, in an electric power conversion apparatus 1 according to the eleventh embodiment, the third-voltage section 63, which is connected with the electric power conversion section 31 of the electric power conversion unit 3, is constituted of a low-voltage battery BLa that is different from the low-voltage battery BL constituting the second-voltage section 62.

The low-voltage battery BLa is lower in voltage than the high-voltage battery BH constituting the first-voltage section 61. The low-voltage battery BLa is also installed in the vehicle, similar to the low-voltage battery BL constituting the second-voltage section 62.

The low-voltage battery BLa constituting the third-voltage section 63 is different in voltage from the low-voltage battery BL constituting the second-voltage section 62. For example, the nominal voltage of the low-voltage battery BLa may be 7V or 48V whereas the nominal voltage of the low-voltage battery BL is 12V.

That is, in the present embodiment, the electric power conversion section 31 is connected with a first electric power storage device (i.e., the low-voltage battery BLa) constituting the third-voltage section 63, whereas both the main DC-to-DC converter 2 and the auxiliary DC-to-DC converter 32 are connected with a second electric power storage device (i.e., the low-voltage battery BL) constituting the second-voltage section 62. The first electric power storage device is different in voltage from the second electric power storage device.

To the low-voltage battery BL constituting the second-voltage section 62, there are connected electrical loads that may influence traveling of the vehicle. On the other hand, to the low-voltage battery BLa constituting the third-voltage section 63, there are connected electrical loads that have no or only small influence on traveling of the vehicle.

In the present embodiment, when the main DC-to-DC converter 2 is in the normal state, electric power is supplied from the high-voltage battery BH (i.e., the first-voltage section 61) to the low-voltage battery BL (i.e., the second-voltage section 62) via the main DC-to-DC converter 2, as indicated by an arrow P3 in FIG. 23. Moreover, electric power is also supplied from the high-voltage battery BH (i.e., the first-voltage section 61) to the low-voltage battery BLa (i.e., the third-voltage section 63) via the electric power conversion section 31 of the electric power conversion unit 3, as indicated by an arrow P1 in FIG. 23.

In contrast, when the main DC-to-DC converter 2 is in the abnormal state, electric power is supplied from the high-voltage battery BH (i.e., the first-voltage section 61) to the low-voltage battery BL (i.e., the second-voltage section 62) via the auxiliary DC-to-DC converter 32, as indicated by an arrow P11 in FIG. 24. Meanwhile, part of electric power which would be supplied from the high-voltage battery BH to the low-voltage battery BLa (i.e., the third-voltage section 63) if the main DC-to-DC converter 2 was in the normal state is also supplied to the low-voltage battery BL (i.e., the second-voltage section 62).

That is, in the present embodiment, when the main DC-to-DC converter 2 is in the abnormal state, the supply of electric power to the low-voltage battery BLa (i.e., the third-voltage section 63) as indicated by an arrow P12 in FIG. 24 is limited, thereby securing the supply of electric power to the low-voltage battery BL (i.e., the second-voltage section 62). Consequently, it becomes possible to reliably feed those electrical loads which are connected to the low-voltage battery BL (i.e., the second-voltage section 62) and which may influence traveling of the vehicle.

Moreover, according to the present embodiment, it is also possible to achieve the same advantageous effects as described in the first and second embodiments.

In addition, though not shown in the figures, in the above-described electric power conversion apparatus 1 according to the eleventh embodiment, the third-voltage section 63 may alternatively be constituted of a first electrical load and the second-voltage section 62 may alternatively be constituted of a second electrical load. That is, the first electrical load may be directly connected to the third switching circuit section 43 without the first electric power storage device (i.e., the low-voltage battery BLa) connected therebetween; the second electrical load may be directly connected to the second switching circuit section 42 without the second electric power storage device (i.e., the low-voltage battery BL) connected therebetween. In this case, the voltage at which the first electrical load operates is different from the voltage at which the second electrical load operates.

In the above-described electric power conversion apparatus 1 according to the eleventh embodiment, the low-voltage battery BLa (i.e., the first electric power storage device) constituting the third-voltage section 63 may alternatively have the same voltage as the low-voltage battery BL (i.e., the second electric power storage device) constituting the second-voltage section 62.

Twelfth Embodiment

Figure 25:
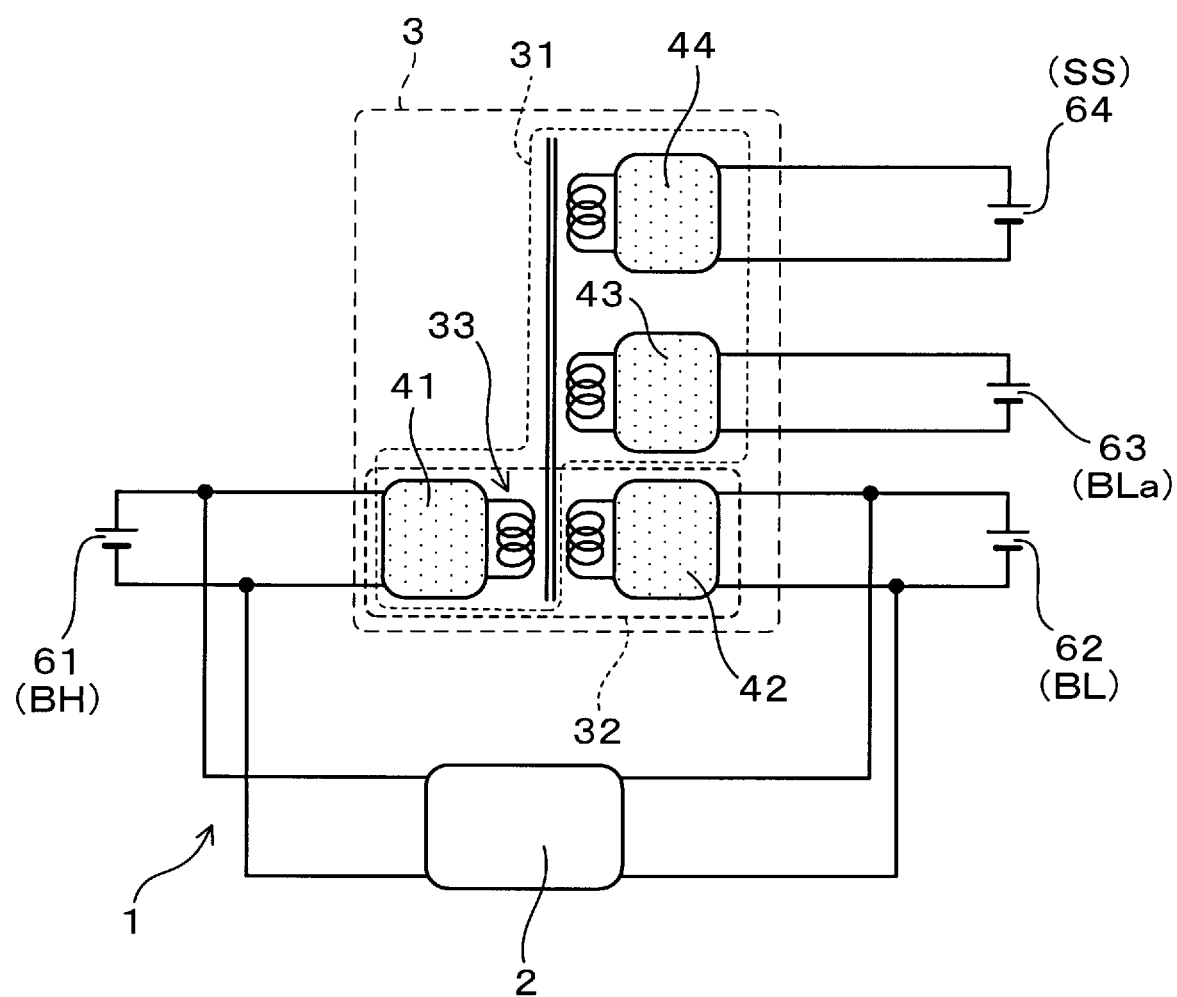
FIG. 25 is a circuit configuration diagram of an electric power conversion apparatus according to a twelfth embodiment.

As shown in FIG. 25, an electric power conversion apparatus 1 according to the twelfth embodiment further has a fourth-voltage section 64 connected to the electric power conversion unit 3, compared to the electric power conversion apparatus 1 according to the eleventh embodiment (see FIG. 22). The fourth-voltage section 64 is constituted of a solar power supply SS.

In the electric power conversion apparatus 1 according to the present embodiment, electric power can be supplied from the solar power supply SS (i.e., the fourth-voltage section 64) to the high-voltage battery BH (i.e., the first-voltage section 61). Moreover, electric power can also be supplied from the solar power supply SS to both the low-voltage battery BL (i.e., the second-voltage section 62) and the low-voltage battery BLa (i.e., the third-voltage section 63).

Consequently, it becomes possible to relax the limitation on the supply of electric power to the low-voltage battery BLa (i.e., the third-voltage section 63) when the main DC-to-DC converter 2 is in the abnormal state. That is, since electric power can also be supplied from the solar power supply SS (i.e., the fourth-voltage section 64) to both the low-voltage battery BL (i.e., the second-voltage section 62) and the low-voltage battery BLa (i.e., the third-voltage section 63), it become possible to supply sufficient electric power to the low-voltage battery BL without significantly reducing the supply of electric power to the low-voltage battery BLa.

In addition, according to the present embodiment, it is also possible to achieve the same advantageous effects as described in the first embodiment.

Thirteenth Embodiment

Figure 26:
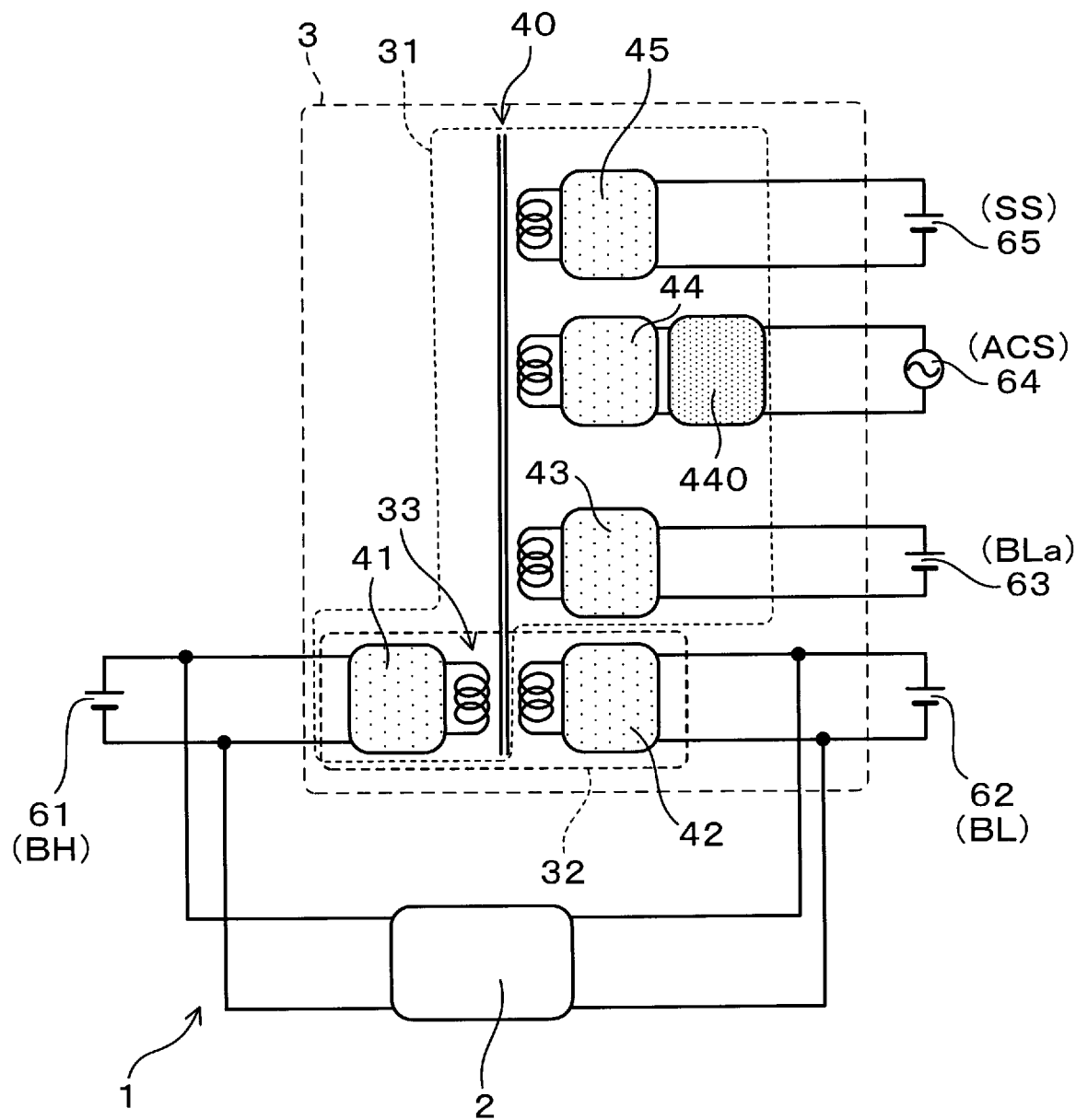
FIG. 26 is a circuit configuration diagram of an electric power conversion apparatus according to a thirteenth embodiment.

As shown in FIG. 26, in an electric power conversion apparatus 1 according to the thirteenth embodiment, to the electric power conversion unit 3, there are connected: the first-voltage section 61 constituted of the high-voltage battery BH; the second-voltage section 62 constituted of the low-voltage battery BL; the third-voltage section 63 constituted of the low-voltage battery BLa; the fourth-voltage section 64 constituted of the AC power supply ACS; and the fifth-voltage section 65 constituted of the solar power supply SS.

The electric power conversion apparatus 1 according to the present embodiment can be regarded as the result of adding the AC power supply ACS to the electric power conversion apparatus 1 according to the twelfth embodiment (see FIG. 25). Moreover, the electric power conversion apparatus 1 according to the present embodiment can also be regarded as the result of replacing the DC power supply DCS in the electric power conversion apparatus 1 according to the tenth embodiment (see FIG. 21) with the low-voltage battery BLa.

According to the present embodiment, it is also possible to achieve the same advantageous effects as described in the tenth and the twelfth embodiments.

Fourteenth Embodiment

Figure 27:
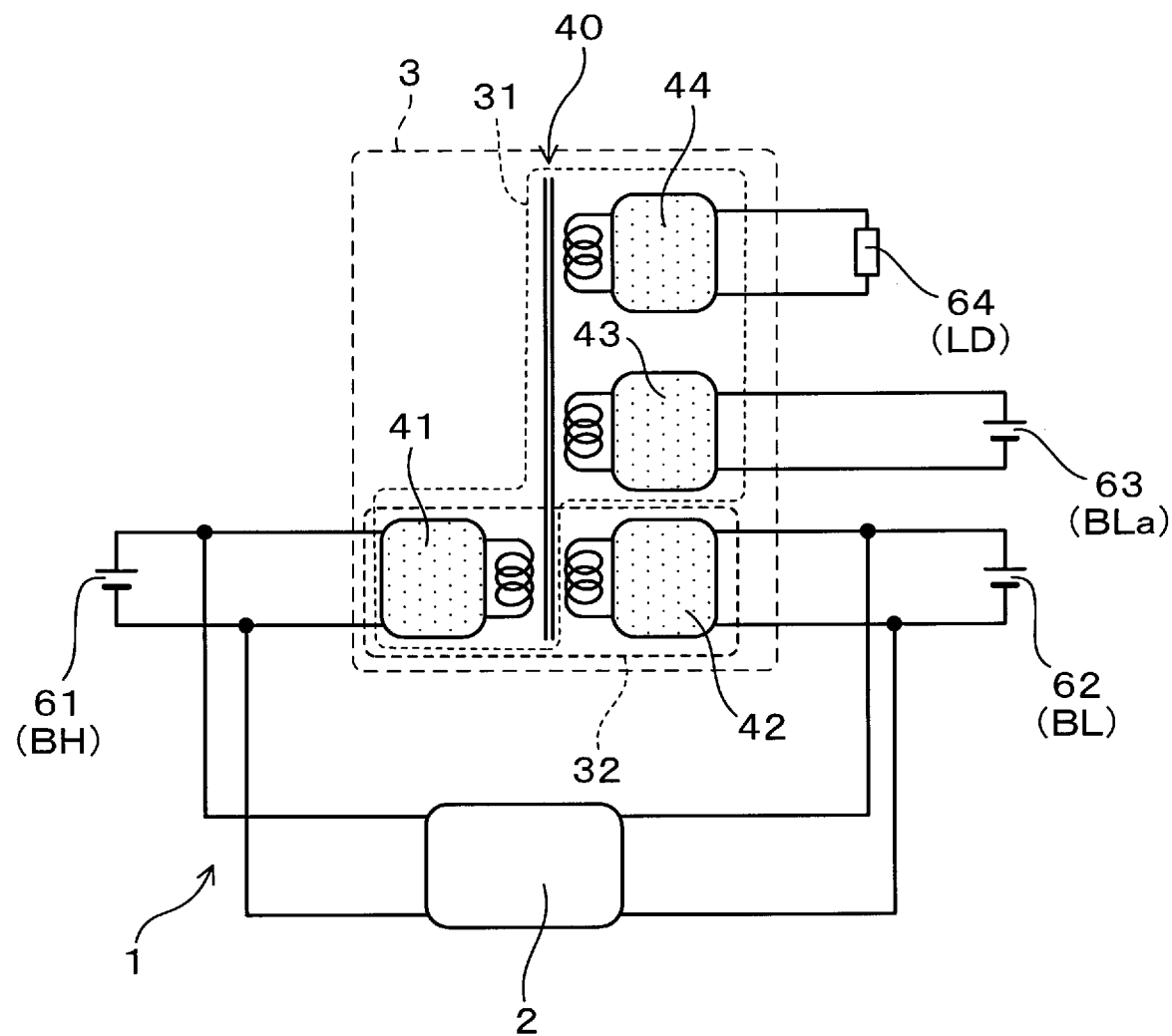
FIG. 27 is a circuit configuration diagram of an electric power conversion apparatus according to a fourteenth embodiment.

As shown in FIG. 27, in an electric power conversion apparatus 1 according to the fourteenth embodiment, to the electric power conversion unit 3, there are connected: the first-voltage section 61 constituted of the high-voltage battery BH; the second-voltage section 62 constituted of the low-voltage battery BL; the third-voltage section 63 constituted of the low-voltage battery BLa; and the fourth-voltage section 64 constituted of the electrical loads LD.

The electric power conversion apparatus 1 according to the present embodiment can be regarded as the result of replacing the solar power supply SS in the electric power conversion apparatus 1 according to the twelfth embodiment (see FIG. 25) with the electrical loads LD. Moreover, the electric power conversion apparatus 1 according to the present embodiment can also be regarded as the result of adding the electrical loads LD to the electric power conversion apparatus 1 according to the eleventh embodiment (see FIG. 22).

In addition, the electrical loads LD constituting the fourth-voltage section 64 are such that operation of the electrical loads LD has no or only small influence on traveling of the vehicle. Such electrical loads LD include, for example, a heater.

In the present embodiment, upon occurrence of any abnormality (or failure) in the main DC-to-DC converter 2, the supply of electric power to the electrical loads LD (i.e., the fourth-voltage section 64) is stopped and the supply of electric power to the low-voltage battery BLa (i.e., the third-voltage section 63) is limited. Consequently, it becomes possible to reliably secure redundancy of the supply of electric power to the low-voltage battery BL (i.e., the second-voltage section 62).

Moreover, according to the present embodiment, it is also possible to achieve the same advantageous effects as described in the eleventh embodiment.

While the above particular embodiments have been shown and described, it will be understood by those skilled in the art that various modifications, changes, and improvements may be made without departing from the spirit of the present disclosure.

For example, to the electric power conversion unit 3, there may be connected six or more sections each operating at a given voltage. In addition, any one of the sections other than the first-voltage section and the second-voltage section can be construed as the third-voltage section of the electric power conversion apparatus 1.

What is claimed is:

1. An electric power conversion apparatus comprising:
   a main DC-to-DC converter configured to perform voltage conversion between a first-voltage section that operates at a first voltage and a second-voltage section that operates at a second voltage; and
   an electric power conversion unit connected with the first-voltage section,
   wherein
   the electric power conversion unit includes:
      an electric power conversion section configured to perform electric power conversion between the first-voltage section and a third-voltage section that operates at a third voltage; and
      an auxiliary DC-to-DC converter connected (i) between the first-voltage section and the second-voltage section and (ii) in parallel with the main DC-to-DC converter,
   wherein
   the auxiliary DC-to-DC converter shares a common configuration section with the electric power conversion section,
   the common configuration section is constituted of at least part of the electric power conversion section,
   the magnitude of the electric power converted by the electric power conversion section changes with time, and
   the electric power conversion unit is configured to be capable of increasing the electric power converted by the auxiliary DC-to-DC converter when the electric power converted by the electric power conversion section decreases.

2. The electric power conversion apparatus as set forth in claim 1, wherein the electric power conversion unit further includes a first switching circuit section connected with the first-voltage section, a second switching circuit section connected with the second-voltage section and a third switching circuit section connected with the third-voltage section, and
   the first switching circuit section, the second switching circuit section and the third switching circuit section are connected with each other via a multi-port transformer.

3. The electric power conversion apparatus as set forth in claim 2, wherein each of the first switching circuit section, the second switching circuit section and the third switching circuit section has a bridge circuit configuration.

4. The electric power conversion apparatus as set forth in claim 1, wherein the electric power conversion section is configured to selectively operate in a first operation mode and a second operation mode,
   the electric power converted by the electric power conversion section is lower in the second operation mode than in the first operation mode, and
   the auxiliary DC-to-DC converter is configured to be capable of performing voltage conversion between the first-voltage section and the second-voltage section during operation of the electric power conversion section in the second operation mode.

5. An electric power conversion apparatus comprising:
   a main DC-to-DC converter configured to perform voltage conversion between a first-voltage section that operates at a first voltage and a second-voltage section that operates at a second voltage; and an electric power conversion unit connected with the first-voltage section,
wherein
the electric power conversion unit includes:
an electric power conversion section configured to perform electric power conversion between the first-voltage section and a third-voltage section that operates at a third voltage; and
an auxiliary DC-to-DC converter connected (i) between the first-voltage section and the second-voltage section and (ii) in parallel with the main DC-to-DC converter,
wherein
the auxiliary DC-to-DC converter shares a common configuration section with the electric power conversion section,
the common configuration section is constituted of at least part of the electric power conversion section, and
the auxiliary DC-to-DC converter is configured to perform voltage conversion between the first-voltage section and the second-voltage section when the electric power conversion section is in a non-operating state where it does not perform the electric power conversion.

6. The electric power conversion apparatus as set forth in claim 1, wherein the first-voltage section is constituted of a battery and the third-voltage section is constituted of a power supply for charging, and
the electric power conversion section is configured to be capable of converting electric power outputted from the third-voltage section into charging electric power and charging the first-voltage section with the resultant charging electric power.

7. The electric power conversion apparatus as set forth in claim 6, wherein the electric power conversion unit is configured to be capable of performing electric power conversion between the power supply, which constitutes the third-voltage section, and the second-voltage section.

8. The electric power conversion apparatus as set forth in claim 1, wherein the third-voltage section is constituted of a first electric power storage device or a first electrical load, and the second-voltage section is constituted of a second electric power storage device or a second electrical load,
the electric power conversion section is connected with the third-voltage section, and both the main DC-to-DC converter and the auxiliary DC-to-DC converter are connected with the second-voltage section, and
the third voltage at which the third-voltage section operates is different from the second voltage at which the second-voltage section operates.

9. The electric power conversion apparatus as set forth in claim 5, wherein the electric power conversion unit further includes a first switching circuit section connected with the first-voltage section, a second switching circuit section connected with the second-voltage section and a third switching circuit section connected with the third-voltage section, and
the first switching circuit section, the second switching circuit section and the third switching circuit section are connected with each other via a multi-port transformer.

10. The electric power conversion apparatus as set forth in claim 9, wherein each of the first switching circuit section, the second switching circuit section and the third switching circuit section has a bridge circuit configuration.

11. The electric power conversion apparatus as set forth in claim 5, wherein the electric power conversion section is configured to selectively operate in a first operation mode and a second operation mode,
the electric power converted by the electric power conversion section is lower in the second operation mode than in the first operation mode, and
the auxiliary DC-to-DC converter is configured to be capable of performing voltage conversion between the first-voltage section and the second-voltage section during operation of the electric power conversion section in the second operation mode.

12. The electric power conversion apparatus as set forth in claim 5, wherein the first-voltage section is constituted of a battery and the third-voltage section is constituted of a power supply for charging, and
the electric power conversion section is configured to be capable of converting electric power outputted from the third-voltage section into charging electric power and charging the first-voltage section with the resultant charging electric power.

13. The electric power conversion apparatus as set forth in claim 12, wherein the electric power conversion unit is configured to be capable of performing electric power conversion between the power supply, which constitutes the third-voltage section, and the second-voltage section.

14. The electric power conversion apparatus as set forth in claim 5, wherein the third-voltage section is constituted of a first electric power storage device or a first electrical load, and the second-voltage section is constituted of a second electric power storage device or a second electrical load,
the electric power conversion section is connected with the third-voltage section, and both the main DC-to-DC converter and the auxiliary DC-to-DC converter are connected with the second-voltage section, and
the third voltage at which the third-voltage section operates is different from the second voltage at which the second-voltage section operates.

* * * * *